(12) United States Patent
Kang et al.

(10) Patent No.: US 8,767,154 B2
(45) Date of Patent: Jul. 1, 2014

(54) PHOTOALIGNMENT METHOD AND LIQUID CRYSTAL DISPLAY

(75) Inventors: Suk-Hoon Kang, Seoul (KR); Baek-Kyun Jeon, Yongin-si (KR); Jun-Woo Lee, Suwon-si (KR); Tae-Ho Kim, Seoul (KR); Sung-Yi Kim, Gwangju-si (KR); Soo-Ryun Cho, Gunpo-si (KR)

(73) Assignee: Samsung Display Co., Ltd. (KR)

( * ) Notice: Subject to any disclaimer, the term of this patent is extended or adjusted under 35 U.S.C. 154(b) by 189 days.

(21) Appl. No.: 13/169,438

(22) Filed: Jun. 27, 2011

(65) Prior Publication Data

US 2012/0038872 A1    Feb. 16, 2012

(30) Foreign Application Priority Data

Aug. 10, 2010   (KR) .................. 10-2010-0077001

(51) Int. Cl.
*G02F 1/1337*    (2006.01)

(52) U.S. Cl.
USPC ............ 349/124; 349/129; 349/187; 430/322

(58) Field of Classification Search
CPC .................. G02F 1/133788; G02F 1/133753; G02F 1/13378; G02F 2001/133761; G02F 1/133765
USPC .................. 349/124, 129, 187, 191; 430/322
See application file for complete search history.

(56) References Cited

U.S. PATENT DOCUMENTS

| | | | |
|---|---|---|---|
| 5,579,140 A | 11/1996 | Yamahara et al. | |
| 5,596,435 A | 1/1997 | Sunohara et al. | |
| 5,831,706 A | 11/1998 | Lyu | |
| 5,909,265 A | 6/1999 | Kim et al. | |
| 6,046,849 A | 4/2000 | Moseley et al. | |
| 6,475,705 B2 | 11/2002 | Kwon et al. | |
| 6,535,260 B1 * | 3/2003 | Tasaka et al. | 349/124 |
| 6,593,986 B2 | 7/2003 | Kwon et al. | |
| 6,671,021 B2 | 12/2003 | Lee | |
| 6,787,292 B2 | 9/2004 | Choi | |
| 7,145,618 B2 | 12/2006 | Reznikov et al. | |
| 7,196,757 B2 | 3/2007 | Lee et al. | |
| 7,365,817 B2 | 4/2008 | Kwon et al. | |
| 2002/0130999 A1 * | 9/2002 | Kim et al. | 349/124 |
| 2005/0105028 A1 * | 5/2005 | Tung et al. | 349/124 |
| 2005/0195349 A1 | 9/2005 | Shin | |
| 2006/0280880 A1 * | 12/2006 | Park | 428/1.1 |
| 2006/0290856 A1 | 12/2006 | Lim | |
| 2010/0035190 A1 * | 2/2010 | Jung et al. | 430/322 |
| 2010/0118246 A1 * | 5/2010 | Nakagawa | 349/129 |
| 2010/0157220 A1 * | 6/2010 | Shin et al. | 349/123 |

FOREIGN PATENT DOCUMENTS

| | | |
|---|---|---|
| JP | 06-347793 A | 12/1994 |
| JP | 2004-341487 A | 12/2004 |
| JP | 2007-256908 A | 10/2007 |
| JP | 4131798 B2 | 6/2008 |
| KR | 1020030037826 A | 5/2003 |
| KR | 1020060101959 A | 9/2006 |
| KR | 10-0662489 B | 12/2006 |

* cited by examiner

*Primary Examiner* — Michael Caley
(74) *Attorney, Agent, or Firm* — Cantor Colburn LLP

(57) ABSTRACT

A photoalignment method includes irradiating light in a first direction to a first alignment layer, and irradiating light in a second direction opposite the first direction, after disposing a first mask on the first alignment layer.

30 Claims, 47 Drawing Sheets

PHOTOALIGNMENT METHOD AND LIQUID CRYSTAL DISPLAY

This application claims priority to Korean Patent Application No. 10-2010-0077001 filed on Aug. 10, 2010, and all the benefits accruing therefrom under 35 U.S.C. §119, the contents of which in their entirety are herein incorporated by reference.

BACKGROUND OF THE INVENTION

1. Field of the Invention

The present invention relates to a photoalignment method and a liquid crystal display utilizing the same.

2. Description of the Related Art

A liquid crystal display ("LCD") typically includes two display panels where a field generating electrode such as a pixel electrode, and a common electrode are formed and a liquid crystal layer interposed therebetween. The LCD generates an electric field in an LC layer by applying voltage to the field generating electrode, to determine orientations of LC molecules of the LC layer and to control a polarization of incident light, thereby resulting in the display of an image.

The LC molecules of the LCD may be initially aligned in a predetermined direction by a conventional rubbing process. Even in a vertically aligned LCD, liquid crystals have a pre-tilt angle by rubbing, to determine a direction of the liquid crystals at the time of applying the electric field.

A conventional method enabling the liquid crystals to have the pre-tilt angle includes a contact-type rubbing method of applying physical pressure to an alignment layer thereof by using a roller, and a photoalignment method for forming the pre-tilt angle by irradiating ultraviolet ("UV") light to the alignment layer. There are drawbacks associated with the use of the conventional photoalignment method. One drawback is that the UV irradiation process may have to be performed several times in order to acquire the liquid crystal alignment of various directions. A plurality of masks is required when performing the UV irradiation process, to form a plurality of domains. These masks may be repetitively used based on the number of times the UV radiation process is performed. If the plurality of masks is misaligned, the liquid crystal alignment of the LCD may become distorted, thereby reducing transmittance.

BRIEF SUMMARY OF THE INVENTION

The present invention obviates the above-mentioned drawbacks by providing a method for photoalignment which reduces the number of times the masks are used, and thereby prevents the reduction of transmittance due to any misalignment of the masks.

According to one exemplary embodiment of the present invention a photoalignment method is provided. The method includes irradiating light in a first direction to a first alignment layer, and irradiating light in a second direction opposite the first direction, after disposing a first mask on the first alignment layer.

According to one exemplary embodiment, a light irradiation energy of the light irradiated in the second direction may be about 50% to about 500% of that in first direction.

According to one exemplary embodiment, the light irradiation energy of the light irradiated in the second direction may be different from that in the first direction.

According to another exemplary embodiment, the light irradiation energy of the light irradiated in the first direction may range from about 1 mJ to about 5000 mJ.

According to another exemplary embodiment, the light irradiated in the first direction may be linearly polarized or partially polarized.

According to another exemplary embodiment the light irradiated in the first direction may be irradiated slantingly with respect to the first alignment layer.

According to an exemplary embodiment, irradiation angles (T) of the light irradiated in the first direction and the second direction may be in the range of about 0<T<90.

According to an exemplary embodiment, the mask may include a light blocking unit to partially shield a part of the first alignment layer.

According to an exemplary embodiment, the light blocking unit may be disposed in a predetermined pattern.

According to another exemplary embodiment, the light blocking unit may be randomly disposed.

According to an exemplary embodiment, the mask may include at least one of a light blocking region, a transmissive region, and a transflective region.

According to an exemplary embodiment, the light blocking region, the transmissive region, and the transflective region may be disposed in a predetermined pattern.

According to an exemplary embodiment, the light blocking region, the transmissive region, and the transflective region may be disposed to form rows and columns.

According to an exemplary embodiment, the transflective region may include two or more regions having different transmittances from each other.

According to another exemplary embodiment, a light transmittance of the transflective region may be greater than that of the light blocking region and smaller than that of the transmissive region.

According to an exemplary embodiment, the light blocking region, the transmissive region, and the transflective region may be randomly disposed.

According to an embodiment of present invention, the method may further include irradiating light in a third direction to a second alignment layer facing the first alignment layer, and irradiating light in a fourth direction opposite direction the third direction after disposing a second mask on the second alignment layer. The first mask and the second mask may each include the light blocking region and the transmissive region, and patterns of the light blocking region and the transmissive region of the first mask and the second mask may be different from each other.

According to an exemplary embodiment, at least one of the first mask and the second mask may further include the transflective region.

According to an exemplary embodiment, at least one of the first mask and the second mask may include at least one of the light blocking region, the transmissive region, and the transflective region.

According to an exemplary embodiment, the light blocking region, the transmissive region, and the transflective region may each be disposed in a predetermined pattern.

According to an exemplary embodiment, the light blocking region, the transmissive region, and the transflective region may be disposed to form rows and columns.

According to an exemplary embodiment, the transflective region may include two or more regions having different transmittances from each other.

According to an exemplary embodiment, a light transmittance of the transflective region may be greater than that of the light blocking region and smaller than that of the transmissive region.

According to an exemplary embodiment, at least one of the first mask and the second mask may include at least one of the light blocking region, the transmissive region, and the transflective region.

According to an exemplary embodiment, the light blocking region, the transmissive region, and the transflective region may be randomly disposed.

According to an exemplary embodiment, an ultraviolet ("UV") wavelength of the irradiated light may range from about 270 nm to about 360 nm.

According to another exemplary embodiment of the present invention a liquid crystal display ("LCD") is provided. The LCD includes a first substrate and a second substrate facing each other, a first alignment layer and a second alignment layer formed on the first substrate and the second substrate, respectively, and a LC layer formed between the first substrate and the second substrate and including liquid crystal molecules. The first alignment layer and the second alignment layer are photoaligned via a photoalignment operation, the first alignment layer and the second alignment layer include a first irradiation region and a second irradiation region having different light irradiation amounts during the photoalignment operation, respectively, and an alignment direction of liquid crystal molecules of a LC layer positioned in the first irradiation region is different from an alignment direction of liquid crystal molecules of a LC layer positioned in the second irradiation region.

According to an exemplary embodiment, absolute values of alignment polar angles of the liquid crystal molecules positioned in the first irradiation region and the second irradiation region may be the same as or different from each other, and the alignment directions may be opposite to each other.

According to an exemplary embodiment, a light irradiation direction of the first alignment layer may be disposed vertical to a light irradiation direction of the second alignment layer, and the liquid crystal molecules of the liquid crystal layer may form at least four regions having different alignment polar angles of the liquid crystal molecules from each other.

According to an exemplary embodiment, each of the four regions may be at least one of a cycle-type in which the alignment direction of the liquid crystal molecules are cycled, a central-type in which the alignment direction of the liquid crystal molecules faces the center of the first alignment layer or the second alignment layer, a diffusion type in which the alignment direction of the liquid crystal molecules faces the edge of the first alignment layer or the second alignment layer, and a mixed-type including at least one of them.

According to an exemplary embodiment, the first alignment layer and the second alignment layer may include cinnamate.

According to another exemplary embodiment, the first alignment layer and the second alignment layer may further include benzene, and a ratio of cinnamate/benzene ("C/B") of the first alignment layer and the second alignment layer may be in the range of $0<C/B<0.5$.

According to an exemplary embodiment, the liquid crystal display may further include a third irradiation region positioned between the first irradiation region and the second irradiation region and a polar angle of the third irradiation region may be smaller than polar angles of the first irradiation region and the second irradiation region.

According to an exemplary embodiment, the liquid crystal display may further include a third irradiation region positioned at edges of the first irradiation region and the second irradiation region and a polar angle of the third irradiation region may be smaller than polar angles of the first irradiation region and the second irradiation region.

According to yet another exemplary embodiment of the present invention a method for photoalignment is provided. The method includes performing a primary photoalignment by irradiating light in a primary photoalignment direction onto a first alignment layer and placing a first mask on the first alignment layer. The method also includes performing secondary photoalignment by irradiating light in a secondary photoalignment direction onto the first alignment layer, the secondary photoalignment direction being opposite to the primary photoalignment direction, wherein in performing of the secondary photoalignment, exposure of the first alignment layer to irradiating light is performed while fixing the first alignment layer with respect to the first mask and then moving the first mask or while fixing the first mask with respect to the first alignment layer and then moving the first alignment layer.

According to an exemplary embodiment, the first mask may include a light blocking region and a plurality of transmissive regions.

According to an exemplary embodiment, the widths of the transmissive regions may be different from each other, and the width of one of the transmissive regions may correspond to a length in a movement direction of the first alignment layer in the transmissive region.

According to an exemplary embodiment, the method may further include performing a tertiary photoalignment by irradiating light in a tertiary photoalignment direction onto a second alignment layer facing the first alignment layer and placing a second mask on the second alignment layer. The method may also include performing a quaternary photoalignment by irradiating light in a quaternary photoalignment direction onto the second alignment layer, the quaternary photoalignment direction being opposite to the tertiary photoalignment direction, wherein in the performing of the quaternary photoalignment, exposure of the second alignment layer to irradiating light may be performed while fixing the second alignment layer with respect to the second mask and then moving the second mask or while fixing the second mask with respect to the second alignment layer and then moving the second alignment layer.

According to an exemplary embodiment, the first mask may include a light blocking region and a plurality of transmissive regions.

According to an exemplary embodiment, the widths of the transmissive regions may be different from each other, and the width of one of the transmissive regions may correspond to a length in a movement direction of the first alignment layer in the transmissive region.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
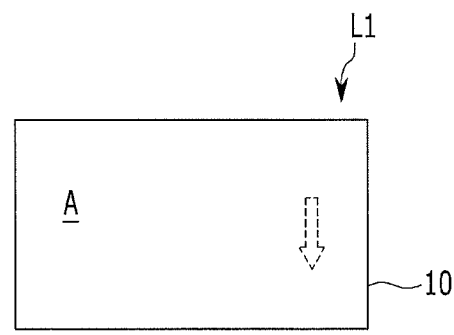
FIGS. 1 and 2 are diagrams illustrating an exemplary embodiment of a photoalignment method according to the present invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals designate refer to like elements throughout.

It will be understood that when an element is referred to as being "on" another element, it can be "directly on" another element, there are no intervening elements present. As used herein, the term "and/or" includes any and all combinations of one or more of the associated listed items. It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 2:
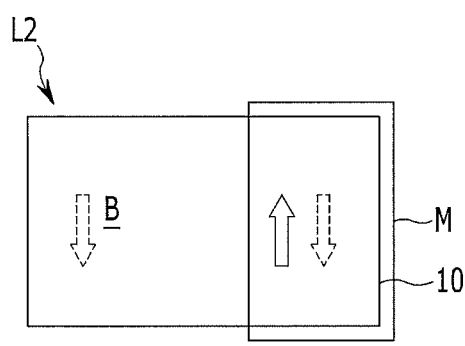

FIGS. 1 and 2 are diagrams illustrating an exemplary embodiment of a photoalignment method according to the present invention.

As shown in FIGS. 1 and 2, the photoalignment method according to an exemplary embodiment of the present invention. As shown in FIG. 1 as a "first photoalignment" operation is performed in which a total surface is exposed without a mask and a "second photoalignment" operation in which light is irradiated to only a partial region by using a mask. As shown in FIGS. 1 and 2 an arrow represents a photoalignment direction.

As shown in FIG. 1, light is irradiated onto an alignment layer 10 in a first direction, to form a first irradiation region L1. According to an exemplary embodiment, an irradiation ultraviolet (UV) wavelength ranges from about 270 nm to about 360 nm and the irradiation energy of the irradiated light is in the range of about 1 mJ to about 5000 mJ.

According to an exemplary embodiment of the present invention, the irradiated light may be linearly polarized ultraviolet ("LPUV") or partially polarized ultraviolet. The LPUV is irradiated at an angle oblique to a surface of the alignment layer to have an effect as if the surface of the alignment layer is rubbed in a predetermined direction. A method of irradiating the LPUV obliquely to the surface of the alignment layer is performed by tilting the alignment layer or tilting a linearly polarized irradiation device.

Further, shown in FIG. 1, a "first photoalignment" operation is performed by irradiating light in a first direction which may be in any direction, but illustration purposes, in the exemplary embodiment of the present invention, the first direction is from the top to the bottom as indicated by the arrow shown.

Next, as shown in FIG. 2, the method further includes disposing of a light blocking mask M corresponding to a portion of the alignment layer 10, and performing a "second photoalignment" operation to form a second irradiation region L2. The light blocking mask M does not transmit light and shields half of the first irradiation region L1. As further shown in FIG. 2, light is then irradiated in a second direction (as indicated by the solid arrow) opposite to the first direction (as indicated by the dotted arrow).

As shown in FIG. 2, the light blocking mask M according to the exemplary embodiment of the present invention is disposed to cover half of the first irradiation region L1, but may be of various sizes and shapes depending on the type of a domain to be formed and may be formed for a light blocking unit to have a predetermined pattern or to be randomly disposed within the mask M.

According to an exemplary embodiment, a polar angle of the alignment layer 110 may be controlled to have different values depending on an irradiation energy amount and in the exemplary embodiment of the present invention, the irradiation energy amount of the light irradiated in the second direction may be greater than that of the first direction, to form the first irradiation region L1 and the second irradiation region L2 which have a first polar angle and a second polar angle of different polarities.

Thus, according to an exemplary embodiment, an irradiation energy of the light irradiated in the second direction is greater than an irradiation energy of the light irradiated in the first direction, to form the second irradiation region L2 such that the first polar angle is a same angle as that of the second polar angle and polarities of the first and second polar angles are opposite to each other.

Table 1 illustrates a change of the polar angle depending on irradiation energy of the light.

| Glass No. | Alignment layer | Photolithography condition | | Pre-tilt angle |
|---|---|---|---|---|
| | | $1^{st}$ (positive direction) | $2^{nd}$ (opposite-direction photolithography) | |
| #1 | 1035R1 | 50°, 50 mJ | 50°/25 mJ | −89.9 |
| #2 | | | 50°/50 mJ | −89.1 |
| #3 | | | 50°/100 mJ | −88.2 |
| Ref. | | | — | 88.3 |

Referring to Table 1, during the "first photoalignment" operation, an irradiation energy amount of 50 mJ and at an irradiation slope of 50° and thereafter, the irradiation energy amount is changed in the order of 25 mJ, 50 mJ, and 100 mJ, second polar angles of the opposite polarity such as 89.9°, 89.1° and 88.2° may be acquired. Herein, (−) means an opposite direction.

When the second polar angle of the second irradiation region L2 includes a pre-tilt angle of 89.9° or 89.1°, which has a direction opposite to and a value different from the first polar angle when the first polar angle of the first irradiation region L1 is 88.3°, for example, a luminance difference between the irradiation regions L1 and L2 may occur. However, when the second polar angle is of a value similar to the first polar angle, e.g., 88.2°, the luminance difference between the irradiation regions L1 and L2 decreases.

Therefore, as shown in Table 1, by irradiating light in the second direction with an amount of irradiation energy for example, two times greater than the irradiation energy amount of the light irradiated in the first direction, the first polar angle and the second polar angle may have the same value. However, since the amount irradiation energy of the light irradiated in the second direction may depend on a material of the alignment layer 110, an irradiation angle, an irradiation intensity, and the like, it is selected within the range of about 50% to about 500% of the irradiation energy of the light irradiated in the first direction. Therefore, according to the current exemplary embodiment, the first polar angle and the second polar angle are of a same value.

As a result of the photoalignment method shown in FIGS. 1 and 2, according to an exemplary embodiment of the present invention, a first irradiation region L1 and a second irradiation region L2 which have different polar angles may be acquired. The alignment polar angle as an angle at which liquid crystal molecules form with a substrate, and a viewing angle may improve the response speed of the liquid crystal molecules. Further, the viewing angle may also be improved by forming various alignment polar angles.

Figure 3:
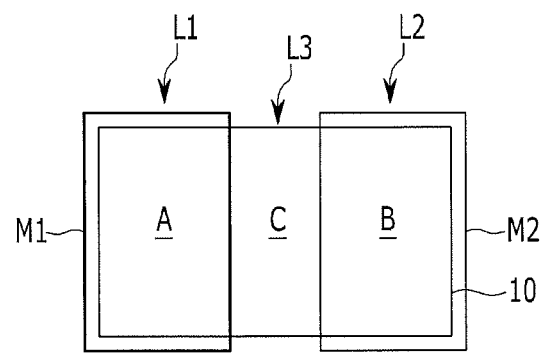
FIGS. 3 and 4 are diagrams illustrating a misalignment occurring during a conventional photo alignment operation.
Figure 4:
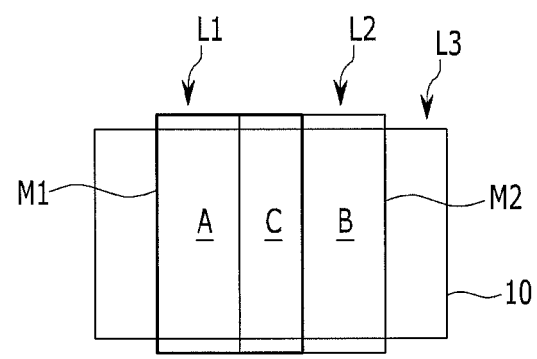
Figure 5:
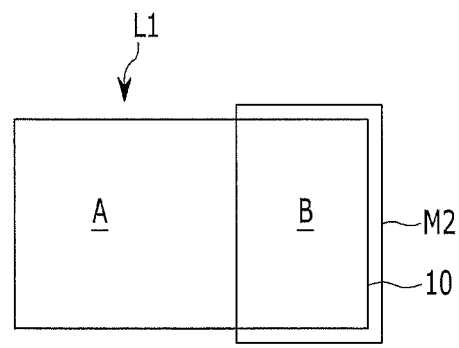
FIGS. 5 to 7 are diagrams illustrating an exemplary of a misalignment occurring during a photoalignment according to the present invention.
Figure 6:
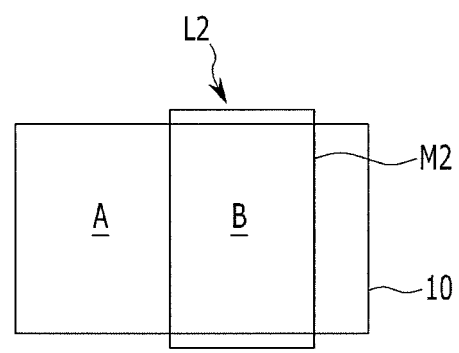
Figure 7:
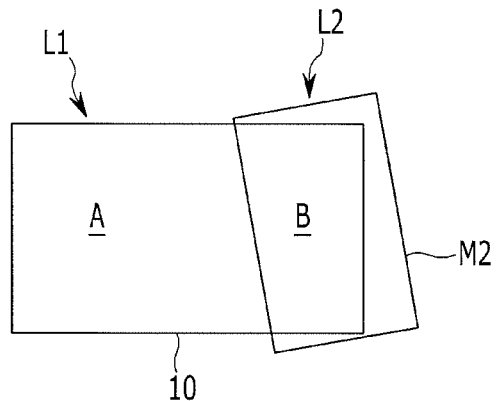

FIGS. 3 and 4 are diagrams illustrating a misalignment occurring during a conventional photoalignment operation while FIGS. 5 to 7 are diagrams illustrating an exemplary embodiment of a misalignment occurring during a photoalignment operation according to the present invention.

As shown in FIGS. 3 and 4, in the conventional photoalignment method, when a photoalignment operation is performed in order to form the first irradiation region and the second irradiation region having different polar angles, the photoalignment operation is performed using different masks M1 and M2 for each irradiation region.

Therefore, when the misalignment occurs in the case in which the mask M2 for forming the second irradiation region L2 is disposed after forming the first irradiation region L1, a third irradiation region L3 in which the masks M1 and M2 are not overlapped with each other as shown in FIG. 3 and both masks M1 and M2 are overlapped with each other is formed as shown in FIG. 4. The third irradiation region L3 has a polar angle different from the first irradiation region L1 and the second irradiation region L2 which have the polar angles to be aligned, thus decreasing transmittance.

When the photoalignment method is performed as described in the exemplary embodiment of the present invention, only shapes or dimensions of the first irradiation region L1 and the second irradiation region L2 are different, but the third irradiation region L3 having an undesired polar angle is not generated as shown in FIGS. 3 and 4, even though the misalignment occurs as shown in FIGS. 5 to 7. As a result, when the photoalignment method is performed as described in the exemplary embodiment of the present invention, a decrease in transmittance is prevented.

According to an exemplary embodiment, a method of manufacturing a liquid crystal cell for a liquid crystal display by using a photoalignment method according to the present invention will now be described.

Figure 8:
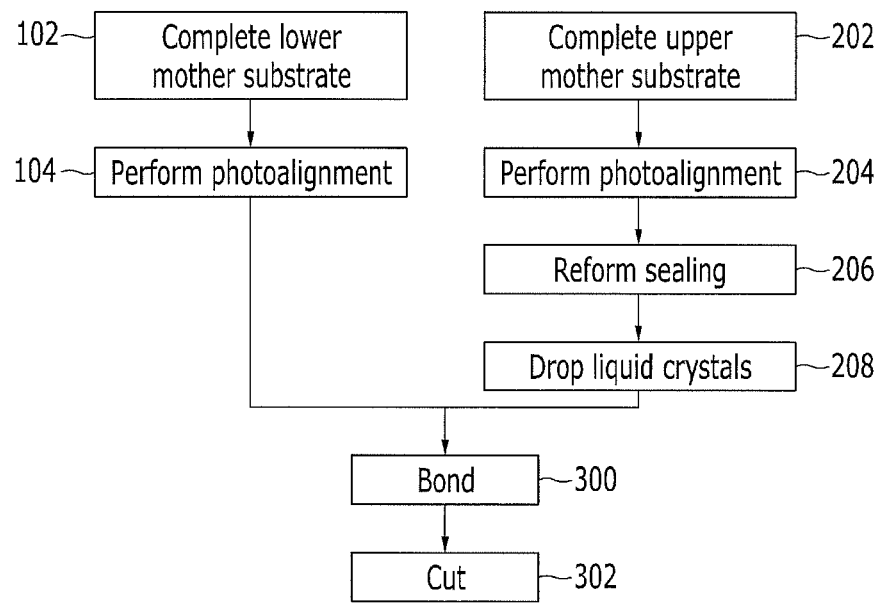
FIG. 8 is a flowchart illustrating an exemplary embodiment of a method for manufacturing a liquid crystal cell of a liquid crystal display according to the present invention.
Figure 9:
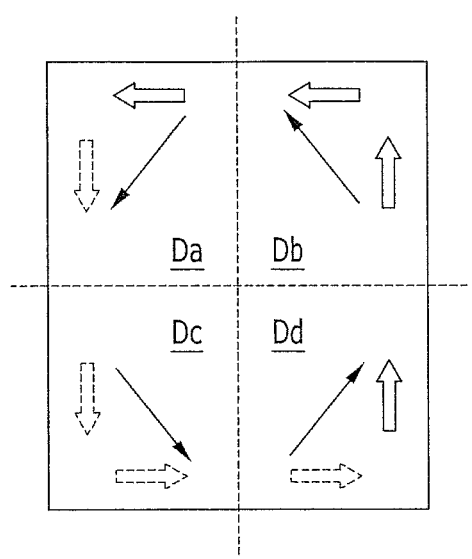
FIG. 9 is a diagram illustrating an exemplary embodiment of photoalignment of liquid crystal molecules after a photoalignment operation according to the present invention.

FIG. 8 is a flowchart illustrating an exemplary embodiment of a method for manufacturing a liquid crystal cell for a liquid crystal display according to the present invention; and FIG. 9 is a diagram illustrating an exemplary embodiment of a photoalignment of liquid crystal molecules after performing a photoalignment operation according to the present invention.

Referring to FIG. 8, in operations 102 and 202, respectively, upper and lower mother substrates are formed. According to an exemplary embodiment, the upper mother substrate includes a common electrode, an alignment layer, and a color filter. The lower mother substrate includes a thin film transistor, a pixel electrode, and the alignment layer.

Next, at operations 104 and 204, respectively, a photoalignment operation is performed on each of the lower mother substrate and the upper mother substrate as shown in FIGS. 1 and 2, respectively.

According to an exemplary embodiment, the alignment layer 10 may be made of a material containing cinnamate and the value of cinnamate/benzene which is contained in the alignment layer 110 after the photoalignment operation may be about $0 < C/B < 0.5$.

The directions in which the photoalignment operations are performed on the lower mother substrate and the upper mother substrate are vertical to each other as shown in FIG. 9. The alignment direction (as depicted by the linear arrow) of liquid crystal molecules is determined to have an azimuth angle which is inclined in a slanting direction with respect to the alignment direction of the upper and lower mother substrates. The alignment direction of the lower mother substrate is represented by an arrow in the vertical direction, and the alignment direction of the upper mother substrate is represented by an arrow in the horizontal direction. Small domains Da, Db, Dc, and Dd having four different azimuth angles are formed by a vector sum depending on the alignment direction of both the upper and lower mother substrates.

In the liquid crystal display, since transmittance becomes the maximum at an alignment azimuth angle of about 45°, the photoalignment is performed to be inclined at 45° with respect to a transmittance axis of a polarizer.

Referring back to FIG. 8, from operation 204 the process continues to operation 206, where a sealant for preventing the liquid crystals from being leaked is formed. According to an exemplary embodiment, the sealant is made of a material for combining the upper and lower mother substrates with each other and defines a portion filled with the liquid crystals. According to one exemplary embodiment, the sealant may be formed on the upper mother substrate. According to an alternative exemplary embodiment, the sealant may be formed on the lower mother substrate.

Next, at operation 208, the liquid crystals are dropped, and from operation 208, the process continues to operation 300 where the lower mother substrate and the upper mother substrate are bonded to each other. From operation 300, the process continues to operation 302 where a liquid crystal display assembly is separated into liquid crystal cells by being scribed along a cut line. When the liquid crystals are filled by a liquid crystal injection method, the liquid crystal cells are separated and thereafter, the liquid crystals are injected.

According to an exemplary embodiment of the present invention, the liquid crystals may not be aligned by using different masks for each domain. Therefore, the number of masks for the photoalignment method may be reduced. Accordingly, a photoalignment method may be simplified, and a manufacturing time of the liquid crystal display may be shortened.

Figure 10:
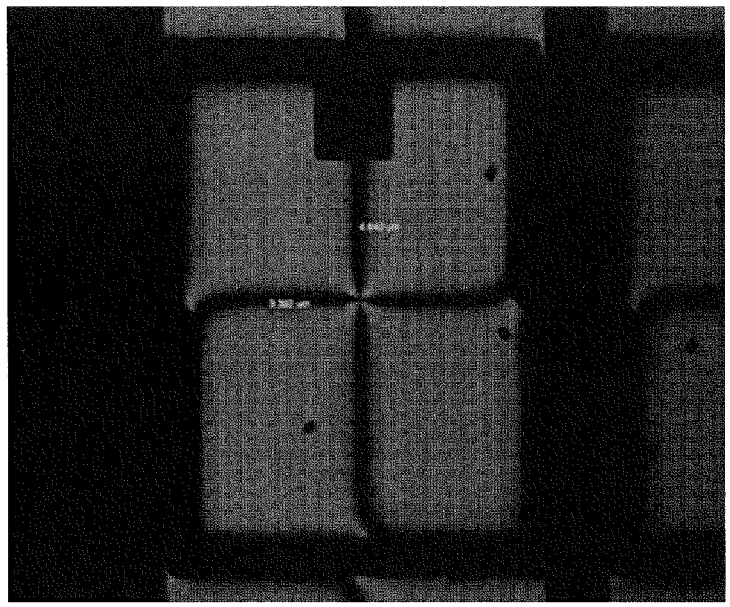
FIG. 10 is a photograph illustrating a texture of conventional a liquid crystal display.
Figure 11:
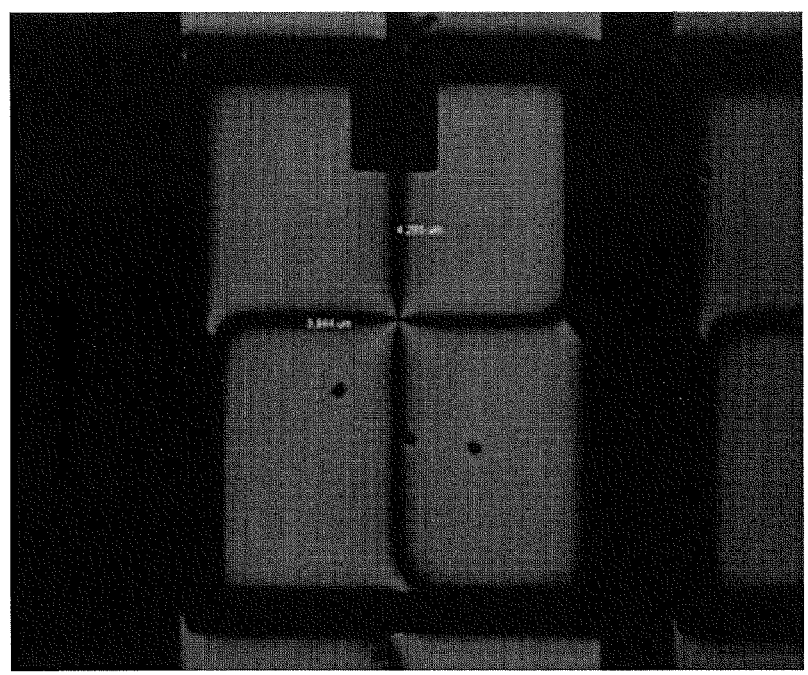
FIG. 11 is a photograph illustrating an exemplary embodiment of a texture of a liquid crystal display according to the present invention.

FIG. 10 is a photograph illustrating a texture of a conventional LCD; and FIG. 11 is a photograph illustrating an exemplary embodiment of a texture of a LCD according to the present invention.

[In FIGS. 10 and 11, polar angles of two liquid crystal displays are the same as 88.3° and textures of the two liquid crystal displays are the same.] Note to client: please confirm the wording of this sentence.

Unlike the conventional photoalignment method, by using the mask only in the "second photoalignment" operation according to an exemplary embodiment of the present invention, a plurality of small domains having different azimuth angles may be easily formed and the texture is not increased as compared with that of the conventional LCD. Thus, when the photoalignment operations are performed as described in the exemplary embodiment of the present invention, since the masks are not aligned during the second photoalignment operation depending on the arrangement of the masks during the first photoalignment operation, the present invention may be free from the misalignment as compared with the conventional photoalignment method. Further, during the second photoalignment operation, since the masks may not be aligned depending on the positions of the masks in the first photoalignment operation, an arrangement time is decreased, thereby decreasing the processing time. Further, as described above, since a third irradiation region having an undesired polar angle is not generated in the present invention, transmittance is increased.

Next, a liquid crystal display formed by using a method for manufacturing a liquid crystal cell of the liquid crystal display according to another exemplary embodiment of the present invention will now be described in detail.

Figure 12:
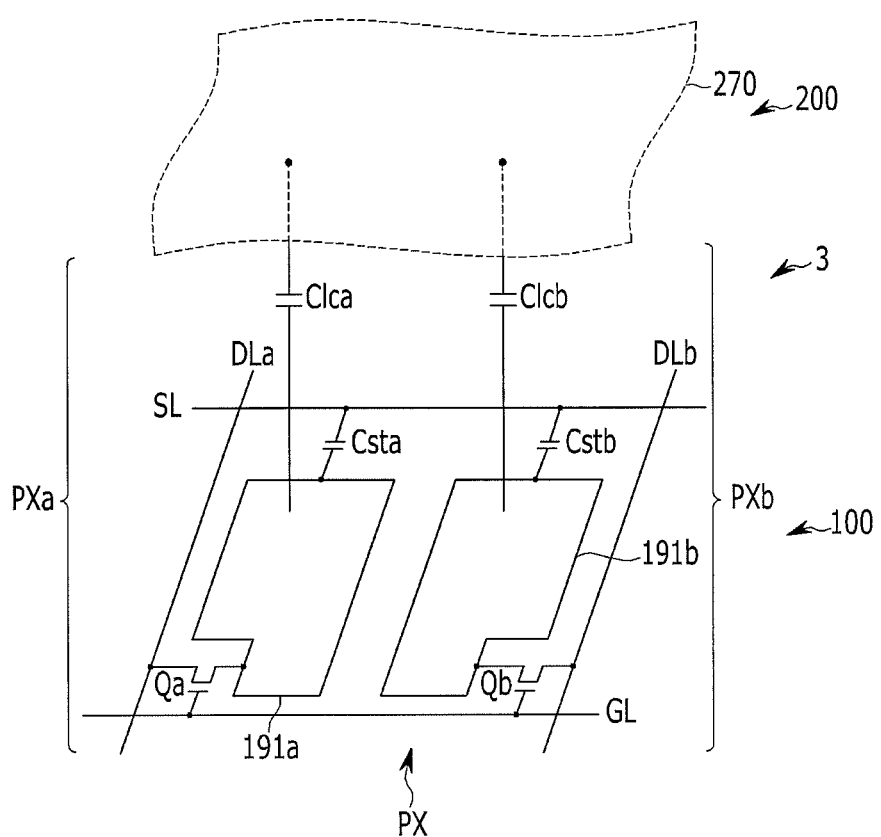
FIG. 12 is an equivalent circuit diagram of an exemplary embodiment of one pixel of a liquid crystal display according to the present invention.

FIG. 12 is an equivalent circuit diagram illustrating an exemplary embodiment of one pixel of a liquid crystal display according to the present invention.

Referring to FIG. 12, the LCD includes signal lines including a plurality of gate lines GL, a plurality of pair of data lines DLa and DLb, and a plurality of storage electrode lines SL, and a plurality of pixels PX connected thereto. The LCD further includes a lower display panel 100 and an upper display panel 200, and a liquid crystal layer 3 interposed therebetween.

According to an exemplary embodiment, each pixel PX includes a pair of subpixels PXa and PXb. The subpixels PXa and PXb include switching elements Qa and Qb and liquid crystal capacitors Clca and Clcb, and storage capacitor Csta and Cstb.

According to an exemplary embodiment, the switching elements Qa and Qb may each be a three-terminal element such as a thin film transistor, and the like, which are provided on the lower display panel 100 and include control terminals connected with the gate line GL and input terminals connected with the data lines DLa and DLb, and output terminals connected with the liquid crystal capacitors Clca and Clcb and the storage capacitors Csta and Cstb.

According to an exemplary embodiment, the liquid crystal capacitors Clca and Clcb include subpixel electrodes 191a and 191b and a common electrode 270 as two terminals and the liquid crystal layer 3 interposed therebetween is formed by a dielectric material.

According to an exemplary embodiment, the storage capacitors Csta and Cstb that perform an auxiliary role of the liquid crystal capacitors Clca and Clcb are configured by overlapping the storage electrode line SL and the subpixel electrodes 191a and 191b that are provided on the lower display panel 100 with each other with an insulator interposed therebetween. A predetermined voltage such as a common voltage Vcom or the like is applied to the storage electrode line SL.

According to an exemplary embodiment, voltages charged in the liquid crystal capacitors Clca and Clcb are set to show a slight difference. For example, a data voltage applied to the liquid crystal capacitor Clca may be set to be lower or higher than a data voltage applied to the liquid crystal capacitor Clcb. Thus, an image viewed from the side of the LCD may appear closer than an image viewed from the front by appropriately adjusting the voltages of liquid crystal capacitors Clca and Clcb, thereby improving the side visibility of the LCD.

Figure 13:
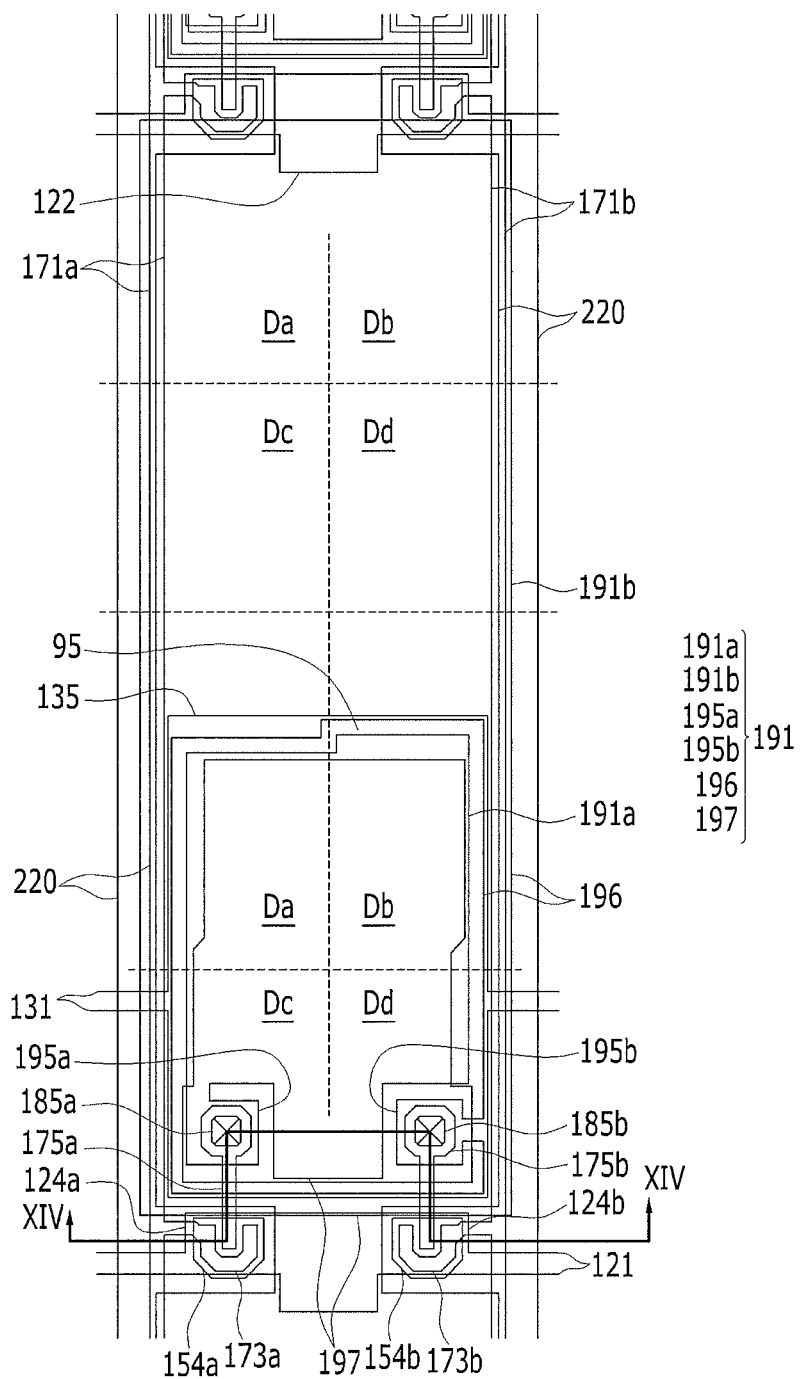
FIG. 13 is an exemplary embodiment of a layout view of a liquid crystal display according to the present invention.
Figure 14:
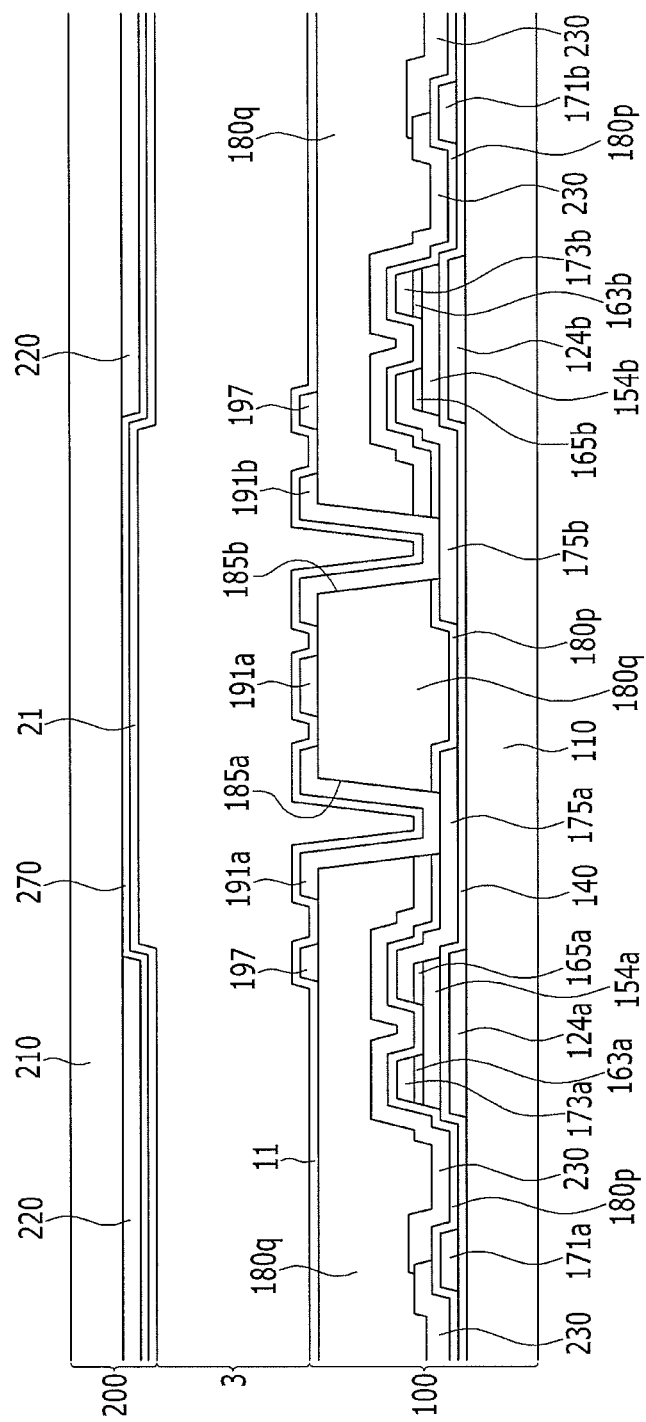
FIG. 14 is a cross-sectional view taken along line XIV-XIV of FIG. 13.

Referring to FIGS. 13 and 14 another exemplary embodiment of a liquid crystal display according to the present invention will now be described in more detail.

Specifically, FIG. 13 is a layout view of a liquid crystal display according to an exemplary embodiment of the present invention; and FIG. 14 is a cross-sectional view taken along line XIV-XIV of FIG. 13.

Referring to FIGS. 13 and 14, the liquid crystal display includes a lower display panel 100 and an upper display panel 200 which face each other and a liquid crystal layer 3 interposed between two display panels 100 and 200.

First, an exemplary embodiment of the lower display panel 100 will be described.

A plurality of gate lines 121 and a plurality of storage electrode lines 131 and 135 are formed on an insulation substrate 110.

According to an exemplary embodiment, the gate lines 121 transfer a gate signal and extend substantially in a horizontal direction. Each gate line 121 includes a plurality of first gate electrodes 124a and second gate electrodes 124b which protrude upwards and a protrusion 122 which protrudes downwards.

The storage electrode lines 131 and 135 include a stem 131 which extends substantially in parallel to the gate line 121 and a ring-type storage electrode 135. The width of a part of the storage electrode 135 extends, and shapes and layouts of the storage electrode lines 131 and 135 may be changed to various forms.

A gate insulating layer 140 as shown in FIG. 14 is formed on the gate line 121 and the storage electrode lines 131 and 135. A plurality of semiconductors 154a and 154b which are made of amorphous or crystalline silicon are formed on the gate insulating layer 140.

According to an exemplary embodiment, a plurality of pair of ohmic contacts 163a, 163b, 165a, and 165b are formed on the semiconductors 154a and 154b, respectively. The ohmic contacts 163a, 163b, 165a, and 165b may be made of a material such as silicide or an n+ hydrogenated amorphous silicon doped with n-type impurities in high concentration, for example.

A plurality of pair of data lines 171a and 171b and a plurality of pair of first drain electrodes 175a and second drain electrodes 175b may be formed on the ohmic contacts 163a, 163b, 165a, and 165b and the gate insulating layer 140.

According to an exemplary embodiment, the data lines 171a and 171b transfer a data signal and may extend substantially in a vertical direction to cross the gate line 121 and the stem 131 of the storage electrode line. The data lines 171a and 171b include a first source electrode 173a and a second source electrode 173b which extend toward a first gate electrode 124a and a second gate electrode 124b to be bent in a U shape. The first source electrode 173a and the second source electrode 173b face a first drain electrode 175a and a second drain electrode 175b on the basis of the first gate electrode 124a and the second gate electrode 124b, respectively.

According to an exemplary embodiment, the first drain electrode 175a and the second drain electrode 175b extend upwards from ends which are surrounded by the first source electrode 173a and the second source electrode 173b, respectively and the other ends may have a large dimension for connecting other layers.

The shapes and layouts of the data lines 171a and 171b in addition to the first drain electrode 175a and the second drain electrode 175b may be varied as needed.

The first gate electrode 124a, the first source electrode 173a, and the first drain electrode 175a form a first switching element Qa (e.g., a thin film transistor ("TFT") together with the first semiconductor 154a and the second gate electrodes 124a and 124b, the second source electrode 173b, and the second drain electrode 175b form a second switching element Qb (e.g., a TFT) together with the second semiconductor 154b.

According to an exemplary embodiment, channels of the switching elements Qa and Qb are formed in the first semiconductor 154a between the first source electrode 173a and the first drain electrode 175a and in the second semiconductor 154b between the second source electrode 173b and the second drain electrode 175b, respectively.

According to an exemplary embodiment, the ohmic contacts 163a, 163b, 165a, and 165b are provided only between the semiconductors 154a and 154b therebelow and the data lines 171a and 171b and the drain electrodes 175a and 175b thereabove and reduce a contact resistance therebetween. Parts which are exposed without being covered by the data lines 171a and 171b and the drain electrodes 175a and 175b are provided in the semiconductors 154a and 154b in addition to spaces between the source electrodes 173a and 173b and the drain electrodes 175a and 175b.

According to an exemplary embodiment, a lower passivation layer 180p made of silicon nitride or silicon oxide, for example, may be formed on the data lines 171a and 171b, the drain electrodes 175a and 175b, and the exposed parts of the semiconductors 154a and 154b.

Further, according to an exemplary embodiment, a color filter 230 may be formed on the lower passivation layer 180p. The color filter 230 elongates in a length direction of a pixel. The color filter 230 may be formed by using a photolithography process or using an inkjet printing method. If the color filter 230 is formed by the inkjet printing method, a partition for containing the color filter and the like may further be formed.

Further, an upper passivation layer 180q is formed on the color filter 230. According to an exemplary embodiment, the upper passivation layer 180q may be made of an in organic insulation or an organic insulation and may include a flat surface. An example of the inorganic insulation may include silicon nitride and silicon oxide. The organic insulation may have photosensitivity and a dielectric constant thereof may be about 4.0 or less. A plurality of pixel electrodes 191 are formed on the upper passivation layer 180q.

According to an exemplary embodiment, each pixel electrode 191 includes a first subpixel electrode 191a and a second subpixel electrode 191b which are separated from each other with a gap 95 interposed therebetween. The gap 95 is overlapped with the storage electrode 135 to prevent light leakage due to the gap 95. The gap 95 may be bent depending on the form of the texture. Upper and lower parts of two subpixel electrodes 191a and 191b engage in each other with the gap 95 interposed therebetween by a bent part.

Further, a lower corner of the first subpixel electrode 191a may have a substantially quadrangular shape which is concaved on the boundary line between the first drain electrode 175a and the second drain electrode 175b.

The first subpixel electrode 191a includes a protrusion 195a which protrudes toward the first drain electrode 175a and is physically and electrically connected with the first drain electrode 175a through a contact hole 185a.

In addition, the second subpixel electrode 191b includes a pair of branches 196 which extend along the data lines 171a and 171b. According to an exemplary embodiment, the branches 196 are positioned between the first subpixel electrode 191a and the data lines 171a and 171b and connected to a connector 197 on the bottom of the first subpixel electrode 191a. Therefore, the first subpixel electrode 191b is surrounded by the second subpixel electrode 191b, the branches 196, and the connector 197. According to an exemplary embodiment of the present invention, one of the branches 196 of the second subpixel electrode 191b includes the protrusion 195b. The protrusion 195b is physically and electrically connected with the second drain electrode 175b through the contact hole 185b.

According to an exemplary embodiment, a dimension occupied by the second subpixel electrode 191b may be greater than that occupied by the first subpixel electrode 191a. Thus, the dimension of the second subpixel electrode 191b may be about 1.0 to about 2.2 times greater than that of the first subpixel electrode 191a.

An upper boundary line of the second subpixel electrode 191b is overlapped with a protrusion 122 of the previous gate line to form a storage capacitor.

An alignment layer 11 is formed on the pixel electrode 191.

Next, the upper display panel 200 according to an exemplary embodiment of the present invention will now be described.

Further as shown, a light blocking member 220 preventing light leakage is formed on a transparent insulation substrate 210 in the upper display panel 200. The light blocking member 220 is formed along the data lines 171a and 171b and includes a part corresponding to the thin film transistor. In the exemplary embodiment of the present invention, a light blocking member 220 which is overlapped with the gate line 121 is not formed, but a light blocking member 220 corresponding to the gate line 121 may further be formed.

In the exemplary embodiment of the present invention, the light blocking member 220 is formed on an upper substrate, but may be formed on a lower substrate.

A common electrode 270 is formed on an overall surface of the light blocking member 220 and an alignment layer 21 is formed on the common electrode 270.

According to an exemplary embodiment of the present invention, a pixel of the liquid crystal display shown in FIGS. 13 and 14 is aligned by the photoalignment method of FIGS. 2 and 3 described above, and includes a plurality of small domains Da to Dd which are aligned in various directions. In the exemplary embodiment of the present invention, the small domains Da to Dd corresponding to the first subpixel 191a and the second subpixel electrode 191b, respectively are formed as shown in FIG. 13, but the small domains Da to Dd may be formed to correspond to the pixel electrode 191. That is, two domains of the small domains Da to Dd are formed in a region corresponding to the first subpixel electrode 191a and the rest two domains of the domains are formed in the second subpixel electrode 191b.

In the above exemplary embodiment, four domains are formed to have a cycle type layout in which a photoalignment direction is progressed in one direction.

However, a method for forming various layouts by using various masks will now be described.

Figure 15:
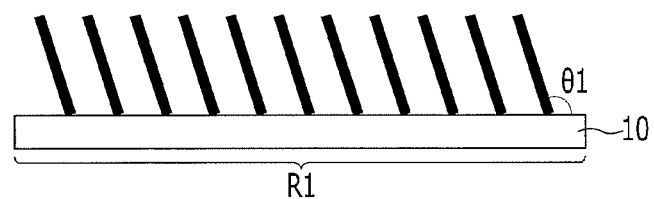
FIGS. 15 to 17 are diagrams illustrating another exemplary embodiment of a photoalignment method according to the present invention.
Figure 16:
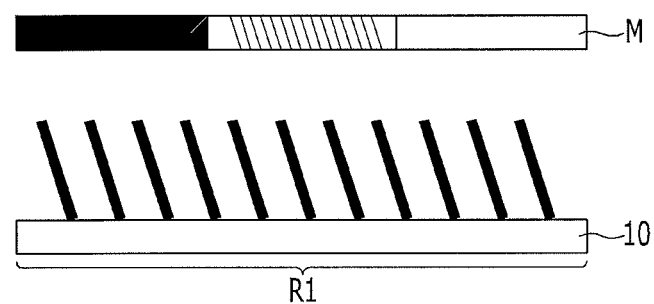

FIGS. 15 and 16 are diagrams for describing another exemplary embodiment of a photoalignment method according to the present invention.

The photoalignment method of FIG. 15 is the same as the photoalignment method shown in FIGS. 1 and 2. However, the mask M including a light blocking region and a transmissive region is used in the second photoalignment operation according as shown in FIGS. 1 and 2, but the photoalignment operation is performed using a mask M including a transflective region in the second photoalignment operation according to the photoalignment method of FIG. 15. The photoalignment using the mask including the transflective region may be progressed on only one of the lower display panel or the upper display panel or may be progressed on both the display panels.

More specifically, first, a first irradiation region R1 is formed by performing a first photoalignment operation on the alignment layer 10 as shown in FIG. 15. According to an exemplary embodiment, the irradiation UV wavelength is in the range of about 270 nm to about 360 nm and the irradiation energy of UV is in the range of about 1 mJ to about 5000 mJ.

In the first photoalignment operation, light is irradiated in a first direction which may be any direction, and is linearly polarized.

When the first photoalignment operation is performed, the alignment direction of liquid crystal molecules is inclined to include a first polar angle $\theta 1$ with respect to a substrate surface as shown in FIG. 15.

Next, as shown in FIG. 16, the mask M corresponding to a part of the alignment layer 10 is disposed. Further, the second photoalignment operation is performed with the linearly polarized light to form a second irradiation region R2 having polar angles $\theta 2$ and $\theta 3$ which are different from the first angle $\theta 1$. The mask M includes a light blocking region which does not transmit light, the transflective region which transmits only part of light, and the transmissive region which transmits the entire light. During the second photoalignment operation light is irradiated at in a second direction which is opposite to the first direction.

The light blocking region, the transflective region, and the transmissive region of the mask M shown in FIG. 16 may be separately disposed with the same dimension and as shown in FIG. 2, the transmissive region may be disposed to correspond to a half of the first irradiation region R1.

According to an exemplary embodiment of the present invention, the light blocking region, the transflective region, and the transmissive region of the mask may be formed to have various dimensions and shapes depending on the form of a domain to be formed and the light blocking region and the transflective region may be formed to have a predetermined pattern or to be randomly disposed in the mask.

Since the polar angle of the alignment layer has different values depending on the energy amount as shown in FIGS. 1 and 2, the irradiation energy amount may be adjusted using the mask including the transflective region as described in the exemplary embodiment of the present invention.

Figure 17:
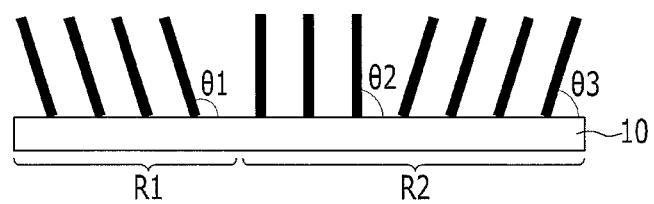

According to an exemplary embodiment, when the second photoalignment operation is performed as shown in FIG. 16, regions having different polar angles θ1, θ2, and θ3 of liquid crystal molecules are formed depending on the corresponding region of the mask as shown in FIG. 17.

That is, as shown in FIG. 15, the liquid crystal molecules which are aligned only in one direction while the first irradiation have a changed alignment to have an opposite direction to the first polar angle θ1 depending on irradiation energy while the second irradiation, as a result, the liquid crystal molecules are aligned to have the second polar angle θ2 and the third polar angle θ3.

According to an exemplary embodiment of the present invention, a slope may be diversified depending on the transmittance of the transflective region, and when the transmittance of the transflective region is about 50% and the irradiation energy amount is two times greater than that in the first irradiation, most of liquid crystal molecules in a part corresponding to the transflective region may be aligned substantially vertical to the substrate and liquid crystal molecules in a part corresponding to the transmissive region may be aligned opposite to the polar angle of liquid crystal molecules in a part corresponding to the light blocking region.

Now referring to FIGS. 18 to 34E, various liquid crystal molecule alignments resulting from the performance of the photoalignment method described above will now be described.

FIGS. 18 to 28 are diagrams illustrating exemplary embodiments of a photomask including various layouts of a light blocking region T0, a transflective region T1, T2, and a transmissive region T3 according to of the present invention; and FIGS. 29A to 34E are diagrams illustrating an exemplary embodiment of a photoalignment method using the photomask of FIGS. 18 to 28 according to the present invention.

Figure 18:
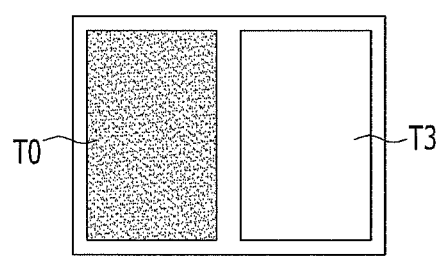
FIGS. 18 to 28 are diagrams illustrating exemplary embodiments of a photomask including various layouts of a light blocking region, a transflective region, and a transmissive region according to the present invention.
Figure 19:
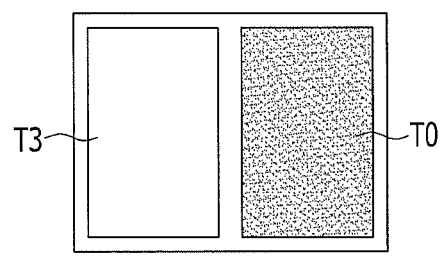
Figure 20:
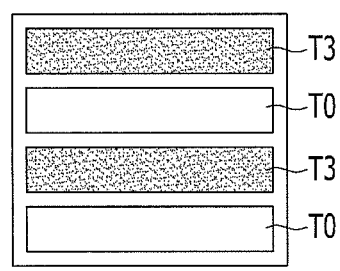

The photomask shown in FIGS. 18 and 19 may include a light blocking region T0 and a transmissive region T3 which each form two columns and one row or may be disposed to form one column and four rows like the photomask shown in FIG. 20.

In addition, according to an exemplary embodiment, the photomask shown in FIGS. 21 to 28 includes a transflective region T1, T2 in addition to the light blocking region T0 and the transmissive region T3.

Figure 21:
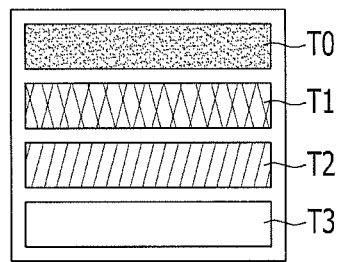
Figure 22:
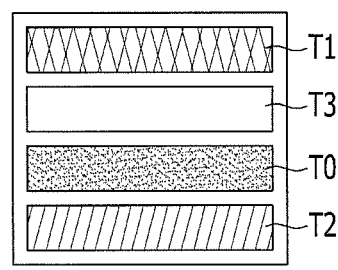
Figure 23:
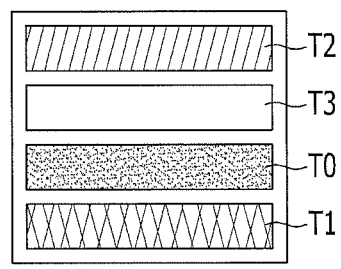

According to an exemplary embodiment, the transflective region T1, T2 of FIGS. 21 to 28 may be divided into a first transflective region T1 and a second transflective region T2 depending on a light transmission level. A light transmission amount in the first transflective region T1 may be smaller than that in the second transflective region T2. The light transmission amounts of the first transflective region T1 and the second transflective region T2 may be variably set in the range of about 0%<transmittance of T1, T2<100% depending on the alignment direction of liquid crystal molecules to be formed. For example, the light transmission amount in the first transflective region T1 may be set to about 25% and the light transmission amount in the second transflective region T2 may be set to about 75% or the light transmission amount in the first transflective region T1 may be set to about 30% and the light transmission amount in the second transflective region T2 may be set to about 70%. According to an exemplary embodiment, the light blocking region T0, the transmissive region T3, and the transflective region T1, T2, the light blocking region T0, the first transflective region T1, the second transflective region T2, and the transmissive region T3 may be arranged in sequence as shown in FIG. 21. Alternately, as shown in FIG. 22, the first transflective region T1, the transmissive region T3, the light blocking region T0, and the second transflective region T2 may be arranged in sequence, or as shown in FIG. 23, the transmissive region T3, the light blocking region T0, the second transflective region T2, and the first transflective region T1 may be arranged in sequence.

Figure 24:
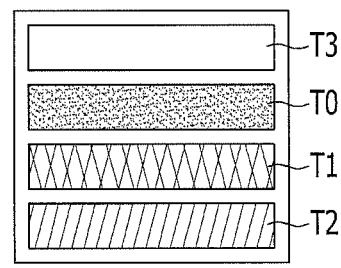
Figure 25:
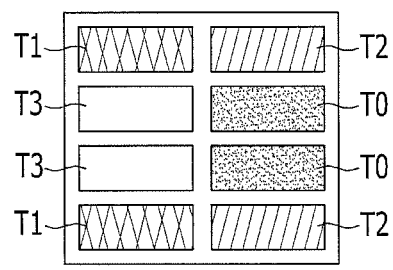
Figure 26:
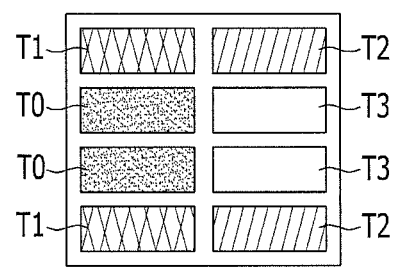

Alternately, as shown in FIG. 24, according to another exemplary embodiment, the light region T0 and the transmissive region T3 may be alternately arranged not to include the transflective region.

The transmissive region T3, the light blocking region T0, and the transflective region T1, T2 may be divided into smaller regions as shown in FIGS. 25 to 28.

The photomask of FIGS. 25 to 28 is disposed for the light blocking region T0, the transmissive region T3, and the transflective region T1, T2 to form two columns and four rows.

According to an exemplary embodiment, the light blocking region T0, the transmissive region T3, and the transflective regions T1 and T2 may have various sizes and layouts and may be variously divided depending on the form and size of the domain.

A photoalignment method by using the above-identified photomask will now be described in detail.

A photoalignment operation is performed on each of an upper alignment layer and a lower alignment layer. Any one of two alignment layers may be aligned as one of the photomasks of FIGS. 18 to 20 and the other one may be aligned as one of the photomasks of FIGS. 21 to 28.

Figure 29A:
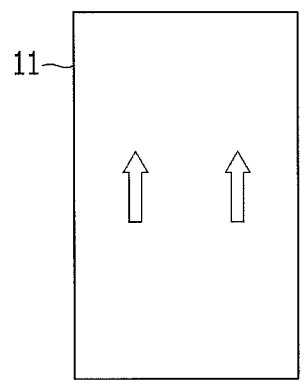
FIGS. 29A-to 34E are diagrams illustrating an exemplary embodiments of a photoalignment method using the photomasks of FIGS. 18 to 28 according to the present invention.

As shown in FIG. 29A, a first photoalignment operation is performed on the lower alignment layer 11 without the photomask. The light is irradiated in a first direction which may be any direction, and for better comprehension and ease of description, light is irradiated from the bottom to the top in FIG. 29A.

Figure 29B:
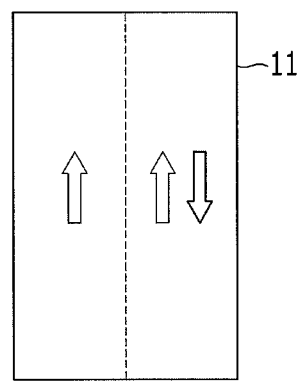

Thereafter, as shown in FIG. 29B, the photomask of FIG. 18 is disposed on the lower alignment layer 11 and a second photoalignment operation is then performed. The light is irradiated in a second direction that is opposite to the first direction.

For better comprehension, the irradiation direction of the light is displayed as an arrow and irradiation energy transferred to the alignment layer 11 is displayed by changing thickness of the arrow. The greater the thickness of a straight line of the arrow is, the more the light energy is transferred to the alignment layer 11.

Figure 29C:
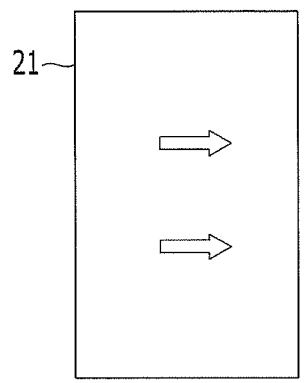

Next, according to an exemplary embodiment, a third photoalignment operation is performed on the upper alignment layer 21 without the photomask as shown in FIG. 29C. The light is irradiated in a third direction vertical to the first direction.

Figure 29D:
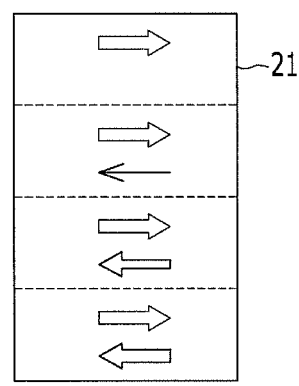

In addition, according to an exemplary embodiment, the photomask of FIG. 21 is disposed on the upper alignment layer 21 and thereafter, a fourth photoalignment operation is performed as shown in FIG. 29D. The light is irradiated in a fourth direction that is opposite to the third direction.

Figure 29E:
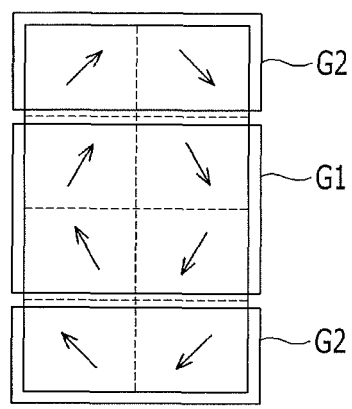

According to an exemplary embodiment, when the upper and lower alignment layers 11 and 21 are aligned using the photomasks of FIGS. 18 and 21, eight regions having different alignment directions may be formed as shown in FIG. 29E. Specifically, four regions which are disposed at the center of the alignment layer form a first group G1 and four regions which form the first group G1 are arranged in the cycle-type liquid crystal alignment.

In addition, four regions which are positioned in upper and lower parts of the first group G1 form a second group G2 and four regions which form the second group G2 are arranged in the cycle-type liquid crystal alignment in the same direction as the first group G1.

According to an exemplary embodiment, absolute values of alignment azimuth angles of the first group G1 and the second group G2 are different from each other and the absolute value of the azimuth angle of the first group G1 may be greater than that of the azimuth angle of the second group G2.

Figure 27:
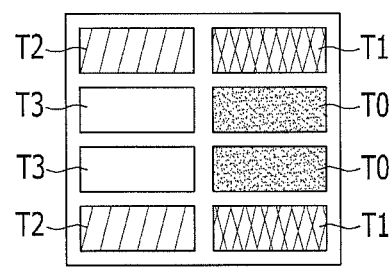

FIGS. 30A-30E depict a diagram illustrating photoalignment method performed using the photomasks of FIGS. 23 and 27. The photoalignment method of FIGS. 30A-30E is similar to the photoalignment method of FIGS. 29A-29E.

Figure 30A:
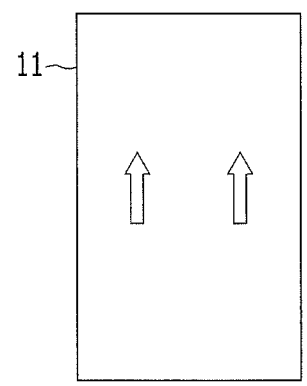
Figure 30B:
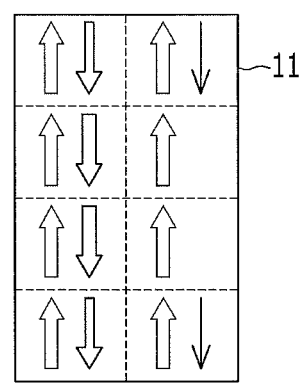
Figure 30C:
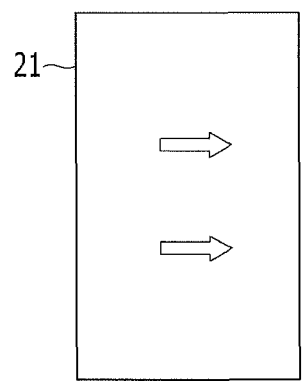
Figure 30D:
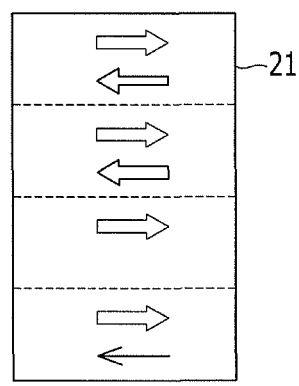

That is, as shown in FIGS. 30A and 30C, a first photoalignment operation of the lower alignment layer 11 and a third photoalignment operation of the upper alignment layer 21 are performed without the photomask. However, a second photoalignment operation is performed using the photomask of FIG. 27 as shown in FIG. 30B and a fourth photoalignment operation is performed using the photomask of FIG. 23 as shown in FIG. 30D.

Figure 30E:
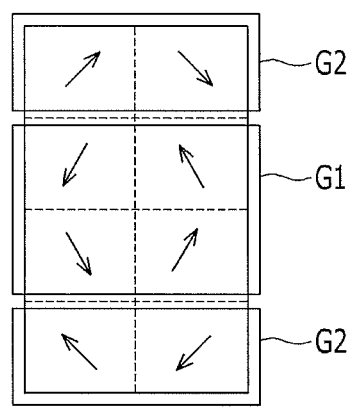

As such, when the photoalignment operations are performed using the photomasks of FIGS. 23 and 27, the alignment of the liquid crystal molecules in which the cycling direction of the first group G1 and the cycling direction of the second group G2 are opposite to each other may be acquired as shown in FIG. 30E. According to an exemplary embodiment, the absolute value of the azimuth angle of the first group G1 and the absolute value of the azimuth angle of the second group G2 may be different from each other.

Figure 31A:
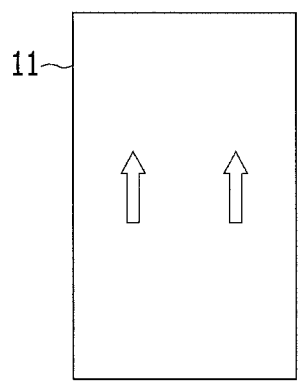

FIG. 31A illustrates a photoalignment method performed using the photomasks of FIGS. 19 and 21 which is similar to the photoalignment method of FIGS. 29A-29E.

Figure 31B:
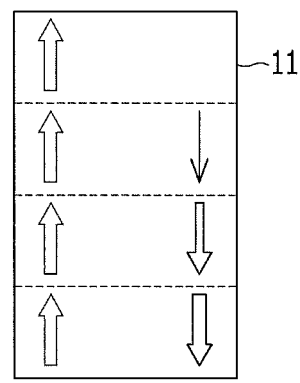
Figure 31C:
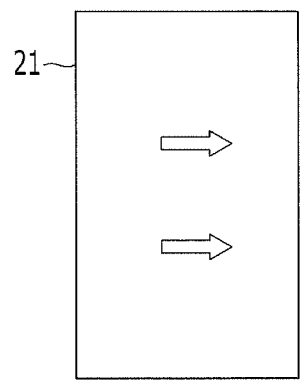
Figure 31D:
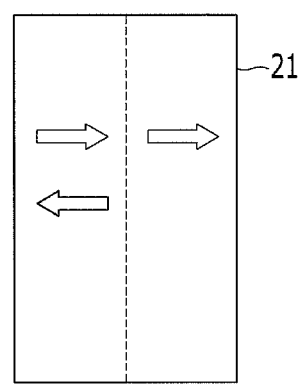

That is, as shown in FIGS. 31A and 31C, a first photoalignment operation of the lower alignment layer 11 and a third photoalignment operation of the upper alignment layer 21 are performed without the photomask. However, a second photoalignment operation is performed using the photomask of FIG. 21 as shown in FIG. 31B and a fourth photoalignment operation is performed using the photomask of FIG. 19 as shown in FIG. 31D.

Figure 31E:
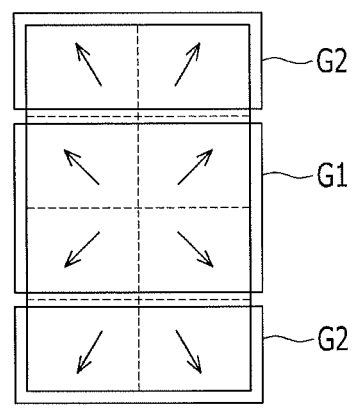

According to an exemplary embodiment, when the photoalignment operation is performed using the photomask of FIGS. 19 and 21, the alignment of the liquid crystal molecules which has a direction diffused from the center of each of the groups G1 and G2 to the outside may be acquired as shown in FIG. 31E. The absolute value of the azimuth angle of the first group G1 and the absolute value of the azimuth angle of the second group G2 may be different from each other.

Figure 28:
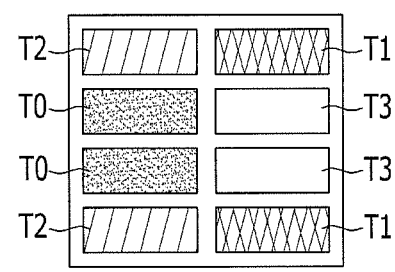

FIGS. 32A-32E illustrate a photoalignment method using the photomasks of FIGS. 20 and 28 which is similar to the photoalignment method of FIG. 29.

Figure 32A:
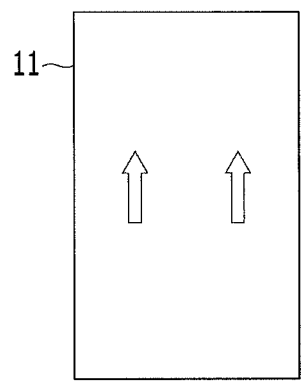
Figure 32B:
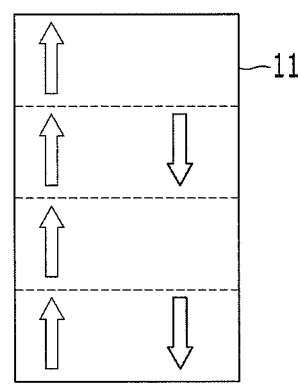
Figure 32C:
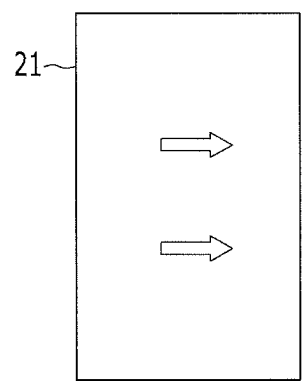
Figure 32D:
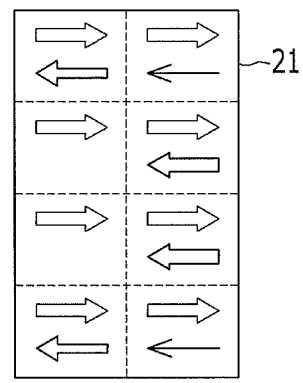

That is, as shown in FIGS. 32A and 32C, a first photoalignment operation of the lower alignment layer 11 and a third photoalignment operation of the upper alignment layer 21 are performed without the photomask. However, the second photoalignment operation is performed using the photomask of FIG. 20 as shown in FIG. 32B and the fourth photoalignment operation is performed using the photomask of FIG. 28 as shown in FIG. 32D.

Figure 32E:
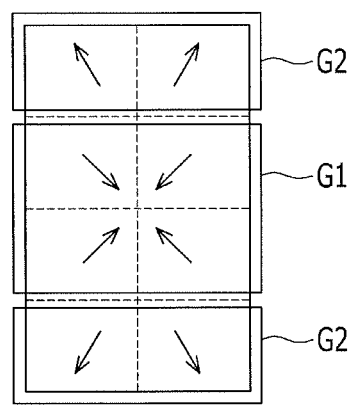

According to an exemplary embodiment, when the photoalignment method is performed using the photomask of FIGS. 20 and 28, the first group G1 forms a centralized alignment which is aligned from the outside to the center and the second group G2 forms a diffused alignment as shown in FIG. 32E. In this case, the absolute value of the azimuth angle of the first group G1 and the absolute value of the azimuth angle of the second group G2 may be different from each other.

FIGS. 33A-33E illustrate a photoalignment method using the photomasks of FIGS. 18 and 23, which is similar to the photoalignment method of FIG. 27.

Figure 33A:
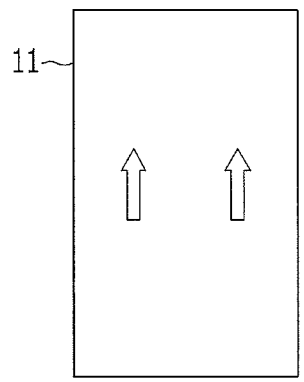
Figure 33B:
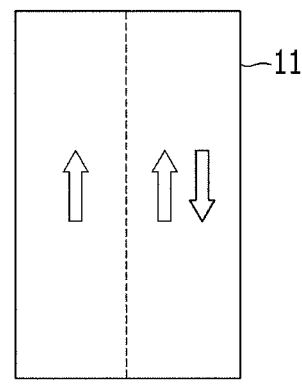
Figure 33C:
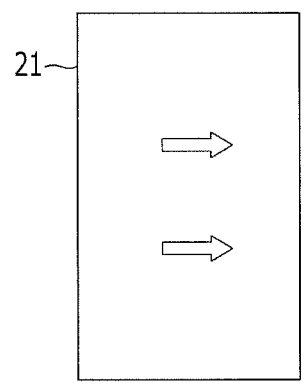
Figure 33D:
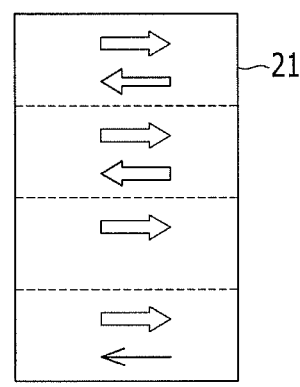

That is, as shown in FIGS. 33A and 33C, a first photoalignment operation of the lower alignment layer 11 and a third photoalignment operation of the upper alignment layer 21 are performed without the photomask. However, a second photoalignment operation is performed using the photomask of FIG. 18 as shown in FIG. 33B and the fourth photoalignment operation is performed using the photomask of FIG. 23 as shown in FIG. 33D.

Figure 33E:
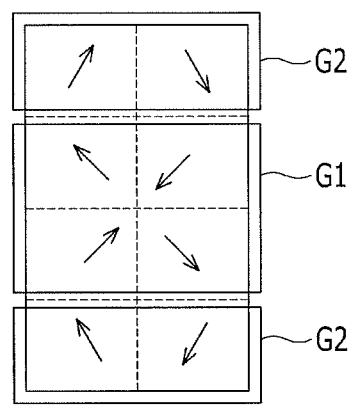

According to an exemplary embodiment, when the photoalignment method is performed using the photomask of FIGS. 18 and 23, the first group G1 includes parts which are aligned in both the central type and the diffusion type and the second group G2 forms the cycle-type alignment as shown in FIG. 33E. Further, the absolute value of the azimuth angle of the first group G1 and the absolute value of the azimuth angle of the second group G2 may be different from each other.

FIGS. 34A-34E illustrate a photoalignment method using the photomasks of FIGS. 18 and 24, which is similar to the photoalignment method of FIG. 29.

Figure 34A:
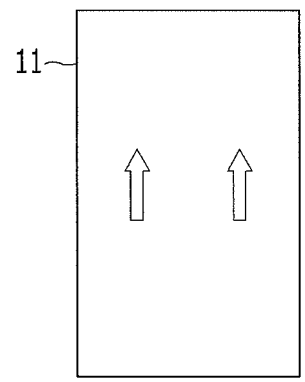
Figure 34B:
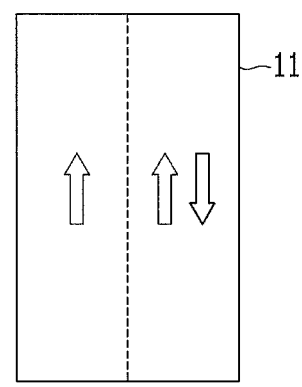
Figure 34C:
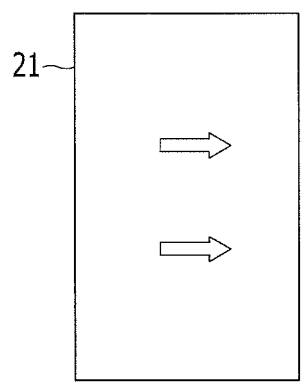
Figure 34D:
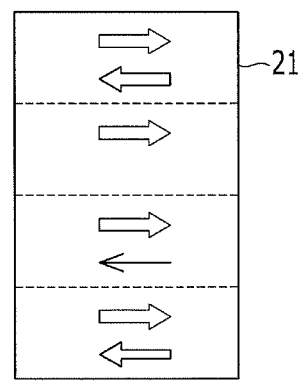

That is, as shown in FIGS. 34A and 34C, a second photoalignment operation of the lower alignment layer 11 and third photoalignment operation of the upper alignment layer 21 are performed without the photomask. However, a second photoalignment operation is performed using the photomask of FIG. 18 as shown in FIG. 34B and a fourth photoalignment operation is performed using the photomask of FIG. 24 as shown in FIG. 34D.

Figure 34E:
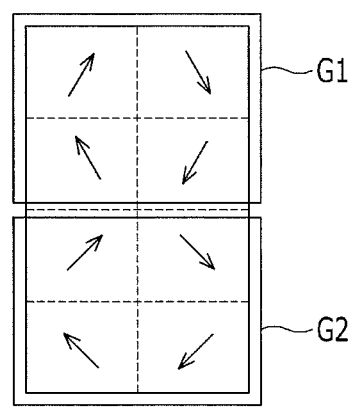

According to an exemplary embodiment, when the photoalignment method is performed using the photomask of FIGS. 18 and 23, the first group G1 and the second group G2 may include parts which are aligned in both the central type and the diffusion type as shown in FIG. 34E. Further, the absolute value of the azimuth angle of the first group G1 and the absolute value of the azimuth angle of the second group G2 may be different from each other.

According to an exemplary embodiment, regarding the first group G1 and the second group G2 of FIGS. 29 to 34, the first group G1 may correspond to the lower part of the first pixel electrode shown in FIG. 13. According to another exemplary embodiment, the first group G1 and the second group G2 may be applied even to the second pixel electrode 191b and separately positioned in the upper and lower parts of the second pixel electrode 191b based on the first pixel electrode 191a.

According to an exemplary embodiment, the photomasks of FIGS. 18 to 28 may be appropriately combined and used depending on the division shape of the domain or pixel electrode to be formed.

In an exemplary embodiment, when the above-mentioned pattern of the photoalignment mask is formed more variously, it is possible to effectively prevent the formation of the texture more effectively.

Figure 35:
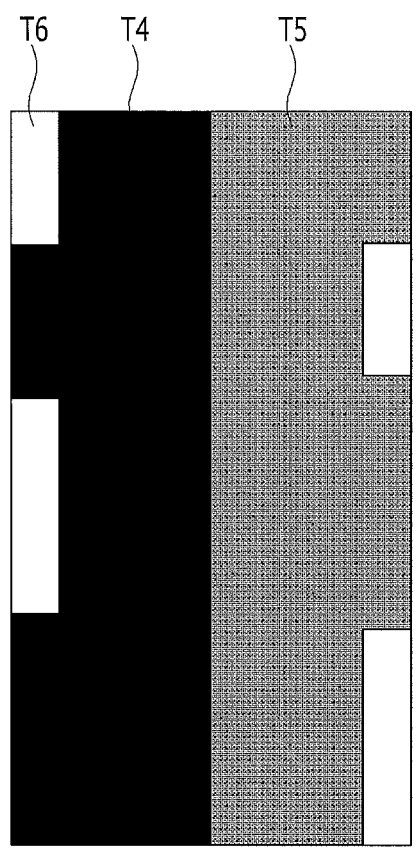
FIGS. 35 and 36 are diagrams showing exemplary embodiments of a photomask according to the present invention.
Figure 36:
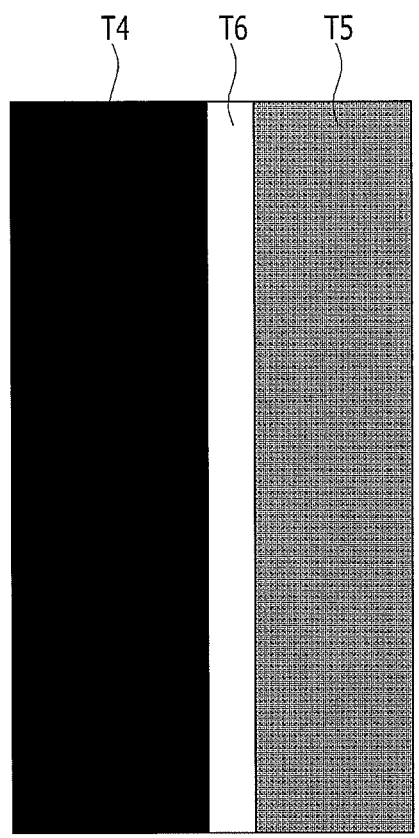

FIGS. 35 and 36 are diagrams showing exemplary embodiments of a photomask according to the present invention.

The photomask of FIG. 35 includes a first transmittance region T4, a second transmittance region T5 and a third transmittance region T6. The first, the second and the third transmittance regions T4, T5 and T6, respectively, have different transmittances.

In an exemplary embodiment, the transmittance of the first transmittance region T4 may be less than the second transmittance region T5, which may be less than the third transmittance region T6.

In an exemplary embodiment, when the first transmittance region T4 is a light blocking region having transmittance of 0% and the third transmittance region T6 is a transmissive region having transmittance of about 100%, the transmittance of the second transmittance region T5 may be from 0% to about 100%.

Further, when both the second transmittance region T5 and the third transmittance region T6 are transflective regions, the transmittance of the third transmittance region T6 may be higher than that of the second transmittance region T5.

In an exemplary embodiment, the first transmittance region T4 and the second transmittance region T5 are disposed adjacent to each other horizontally and bisect a pixel horizontally.

In addition, the third transmittance region T6 is positioned parallel to to the first transmittance region T4 and the second transmittance region T5 and disposed at a position where the texture is generated.

The photomask of FIG. 36 includes the first transmittance region T4, the second transmittance region T5, and the third transmittance region T6 like the photomask of FIG. 35.

In an exemplary embodiment, the first transmittance region T4 and the second transmittance region T5 are disposed adjacent to each other horizontally and bisect the pixel horizontally.

In addition, the third transmittance region T6 is positioned between the first transmittance region T4 and the second transmittance region T5 and disposed at the position where the texture is generated.

Hereinafter, an exemplary embodiment of a method for photoalignment by using the photoalignment masks of FIGS. 35 and 36 will be described in detail with reference to FIGS. 37 to 39.

Figure 37:
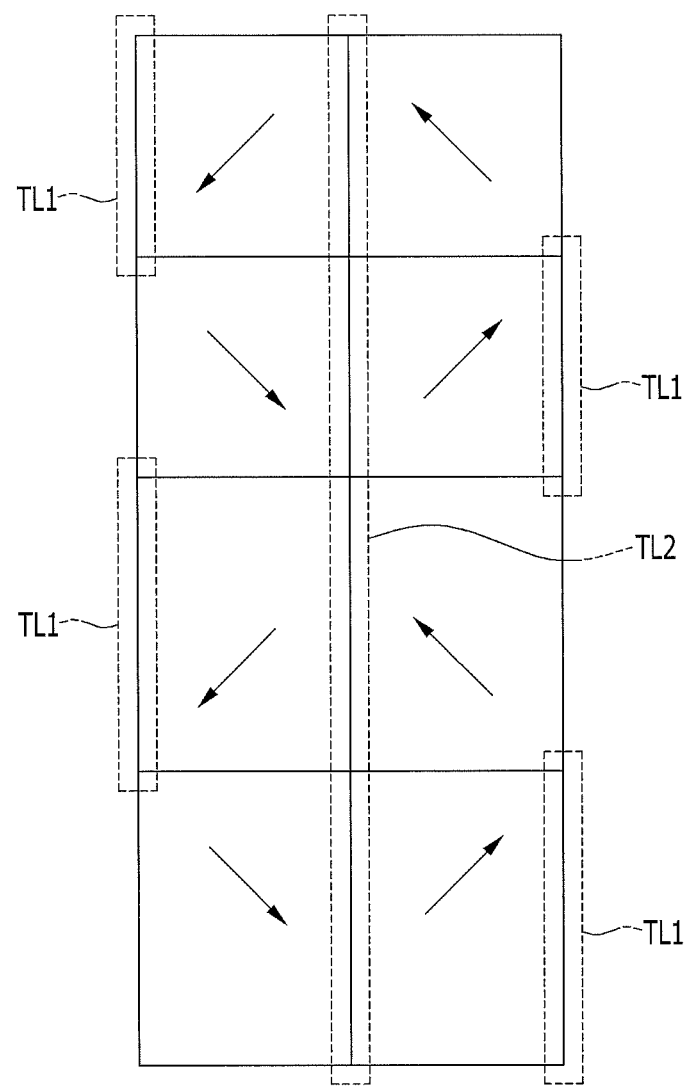
FIG. 37 is a diagram showing an exemplary embodiment of a pixel electrode and a photoalignment direction of a pixel formed according to the present invention.

FIG. 37 is a diagram showing an exemplary embodiment of a pixel electrode and a photoalignment direction of a pixel formed according to the present invention.

FIGS. 38A to 38E are diagrams for describing an exemplary embodiment of a method for photoalignment by using the photoalignment mask of FIG. 35.

FIGS. 39A to 39E are diagrams for describing an exemplary embodiment of a method for photoalignment by using the photoalignment mask of FIG. 36. Referring to FIGS. 12-14 and 37, the pixel electrode 191 includes two subpixel electrodes 191a and 191b positioned in upper and lower parts of the pixel electrode 191. Each of the subpixel electrodes 191a and 191b includes four domains and liquid crystal molecules of four domains form circulating alignment.

In an exemplary embodiment, the texture may be generated in a part where an alignment direction of the liquid crystal molecules aligned by an electric field formed by an edge boundary line of the pixel electrode 191 and an alignment direction of the liquid crystal molecules in a domain are different from each other. For ease of description, this part will be hereinafter referred to as a first texture region TL1.

In addition, the texture may be generated in a part where the alignment directions of the liquid crystal molecules of two adjacent domains are opposite to each other. For ease of description, this part will be hereinafter referred to as a second texture region TL2.

Figure 38A:
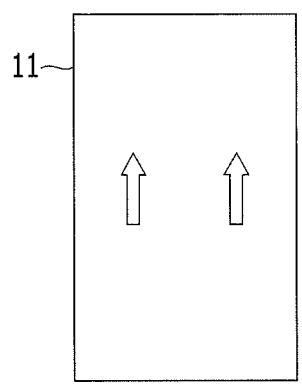
FIGS. 38A to 38E are diagrams for describing an exemplary embodiment of a method for photoalignment by using the photoalignment mask of FIG. 35.

First, an exemplary embodiment of a photoalignment method for reducing the first texture region by using the photomask of FIG. 35 will be described with reference to FIG. 38. Specifically, first, as shown in FIG. 38A, a primary photoalignment is performed on the entirety of a lower alignment layer 11 through whole exposure of lower alignment layer 11. A method for the primary photoalignment is the same as the photalignment method of FIG. 1.

Figure 38B:
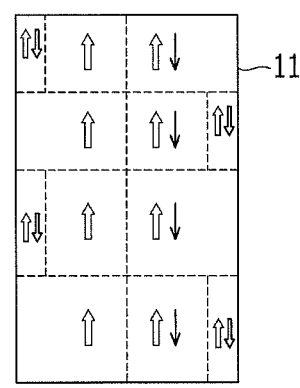

In addition, as shown in FIG. 38B, the photomask of FIG. 35 is disposed and thereafter, a secondary photoalignment is performed in an opposite direction to the primary photoalignment direction. In an exemplary embodiment, the third transmittance region T6 of the photomask is disposed to correspond to the first texture region TL1.

Figure 38C:
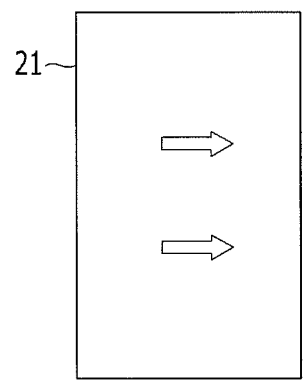

Next, as shown in FIG. 38C, a tertiary photoalignment is performed on an upper alignment layer 21 without the photoalignment mask. In an exemplary embodiment, an irradiation direction of light is vertical to the primary photoalignment direction.

Figure 38D:
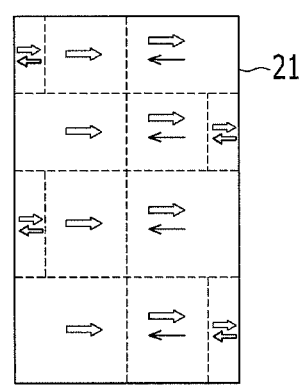
Figure 38E:
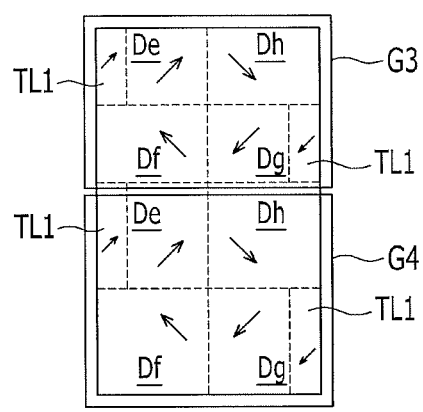

In addition, the photoalignment mask of FIG. 35 is disposed on the upper alignment layer 21 and thereafter, as shown in FIG. 38D, a quaternary photoalignment is performed. In an exemplary embodiment, the irradiation direction of the light is opposite to the tertiary photoalignment direction. As such, when the photoalignment is performed using the photoalignment mask of FIG. 35, a plurality of domains having different alignment directions are formed as shown in FIGS. 37 and 38E.

In an exemplary embodiment, when the pixel is bisected vertically, 6 domains positioned in the upper part constitute a third group G3 and 6 domains positioned in the lower part constitute a fourth group G4. Each of the third group G3 and the fourth group G4 forms circulating liquid crystal alignment placement.

In an exemplary embodiment, an alignment polar angle of liquid crystal molecules positioned in the first texture region TL1 is different from an alignment polar angle of liquid crystal molecules of domains De, Df, Dg, and Dh. That is, as shown in FIGS. 15 to 17, a degree in which the liquid crystal molecules are aligned in the opposite direction varies depending on the energy of light irradiated when the secondary photoalignment is performed in an opposite direction after the primary photoalignment.

In an exemplary embodiment, the third transmittance region T6 having the highest transmittance is placed in the first texture region TL1 to transfer much more exposure energy to the first texture region TL1 than the domains De, Df, Dg, and Dh. Therefore, the liquid molecules positioned in the first texture region TL1 are more slant and have the smaller polar angle than the liquid crystal molecules positioned in the domains De, Df, Dg, and Dh. As such, when the polar angle of the liquid crystal molecules of the first texture region TL1 is smaller than the polar angle of the liquid crystal molecules of the domains De, Df, Dg, and Dh, it is possible to minimize distortion of the alignment of the liquid crystal molecules due to the electric field formed at the edge of the pixel electrode.

Figure 39A:
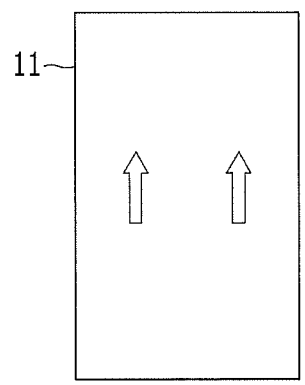
FIGS. 39A to 39E are diagrams for describing an exemplary embodiment of a method for photoalignment by using the photoalignment mask of FIG. 36.

Next, a photoalignment method for reducing the second texture region by using the photomask of FIG. 36 will be described with reference to FIGS. 39A to 39E. Specifically, first, as shown in FIG. 39A, the primary photoalignment is performed on the entirety of the lower alignment layer 11 through whole exposure. The photoalignment method is the same as the photoalignment method of FIG. 1.

Figure 39B:
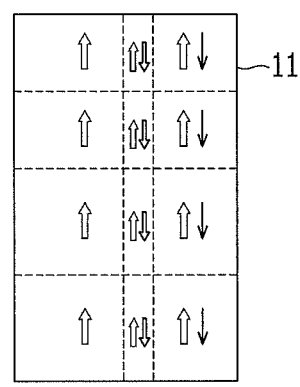

In addition, as shown in FIG. 39B, the photomask of FIG. 36 is disposed and thereafter, the secondary photoalignment is performed in the opposite direction to the primary photoalignment direction. In an exemplary embodiment, the third transmittance region T3 of the photomask is disposed to correspond to a second texture region TL2.

Figure 39C:
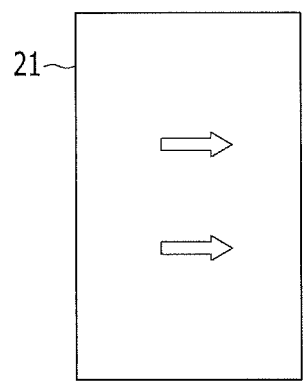

Next, as shown in FIG. 39C, the tertiary photoalignment is performed on the upper alignment layer 21 without the photoalignment mask. In an exemplary embodiment, the irradiation direction of the light is vertical to the primary photoalignment direction.

Figure 39D:
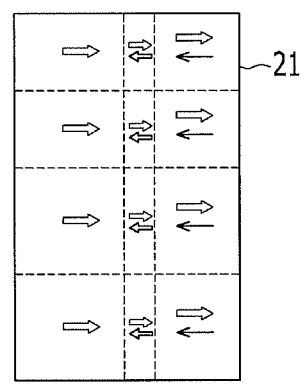
Figure 39E:
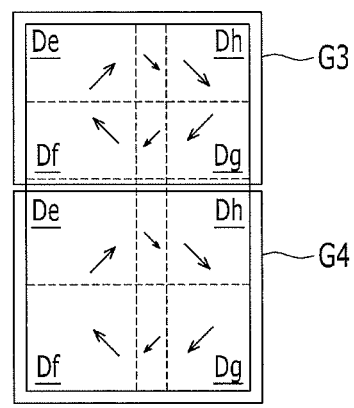

In addition, the photomask of FIG. 36 is disposed on the upper alignment layer 21 and thereafter, as shown in FIG. 39D, the quaternary photoalignment is performed. In an exemplary embodiment, the irradiation direction of the light is opposite to the tertiary photoalignment direction. As such, when the photoalignment is performed using the photoalignment mask of FIG. 36, the plurality of domains having the circulating alignment are formed in the upper and lower parts thereof as shown in FIGS. 37 and 39E.

In an exemplary embodiment, the liquid crystal molecules positioned in the second texture region TL2 have the same azimuth angle as the domains Dg and Dh positioned at the right side around the second texture region TL2. However, the polar angle of the liquid crystal molecules positioned in the second texture region TL2 may be smaller than the polar angle of the liquid crystal molecules of the domains Dg and Dh positioned at the right side, and may be the same as the polar angle of the liquid crystal molecules of the domains De and Df positioned at the left side and the alignment direction of the liquid crystal molecules may be opposite to the alignment direction of the liquid crystal molecules of the domains De and Df.

In an exemplary embodiment, although the exposure energy varies by diversifying the transmittance of the photomask, a method of diversifying the exposure energy by only the light blocking region and the transmissive region will be hereinafter described in detail with reference to FIGS. 40 to 42.

Figure 40:
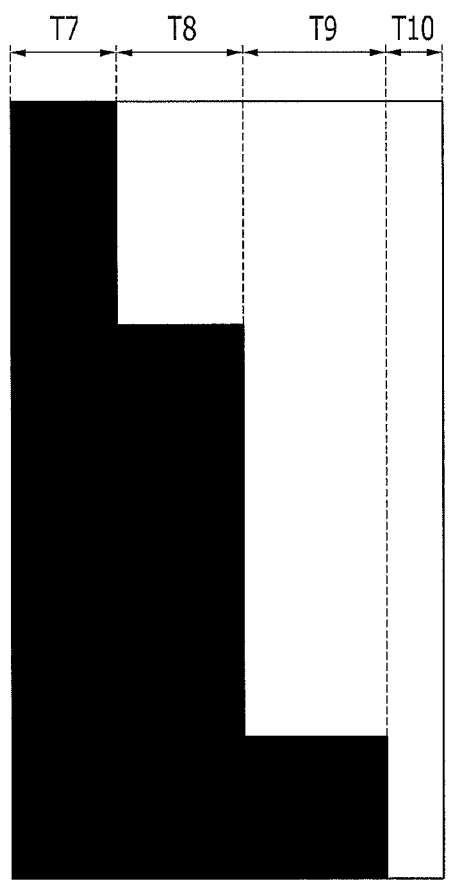
FIGS. 40 and 41 are diagrams showing exemplary embodiments of a photomask according to the present invention.
Figure 41:
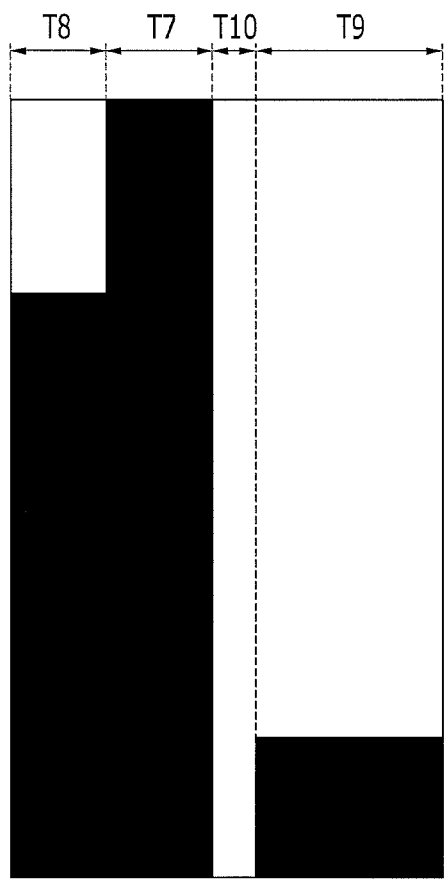

FIGS. 40 and 41 are diagrams showing exemplary embodiments of a photomask according to the present invention.

The photomasks shown in FIGS. 40 and 41 include a fourth transmittance region T7, a fifth transmittance region T8, a sixth transmittance region T9 and a seventh transmittance region T10, each which are constituted by the light blocking region and the transmissive region.

The fourth transmittance region T7 is formed by only the light blocking region having transmittance of 0% and the seventh transmittance region T10 is formed by only the transmissive region having transmittance of about 100%.

In addition, both the fifth transmittance region T8 and the sixth transmittance region T9 include the transmissive region and the light blocking region and are opposite to each other in the sizes of the transmissive region and the light blocking region. In an exemplary embodiment, the size of the light blocking region of the fifth transmittance region T8 is the same as the size of the transmissive region of the sixth transmittance region T9 and the size of the transmissive region of the fifth transmittance region T8 is the same as the size of the light blocking region of the sixth transmittance region T9. Therefore, the photomasks of FIGS. 40 and 41 are inversely symmetric to each other around a virtual vertical center line bisecting the photomask horizontally. As such, the exposure energy in the photoalignment may be diversified by varying the size of the transmissive region as will be described in detail with reference to FIG. 42 and FIG. 40 described above.

Figure 42:
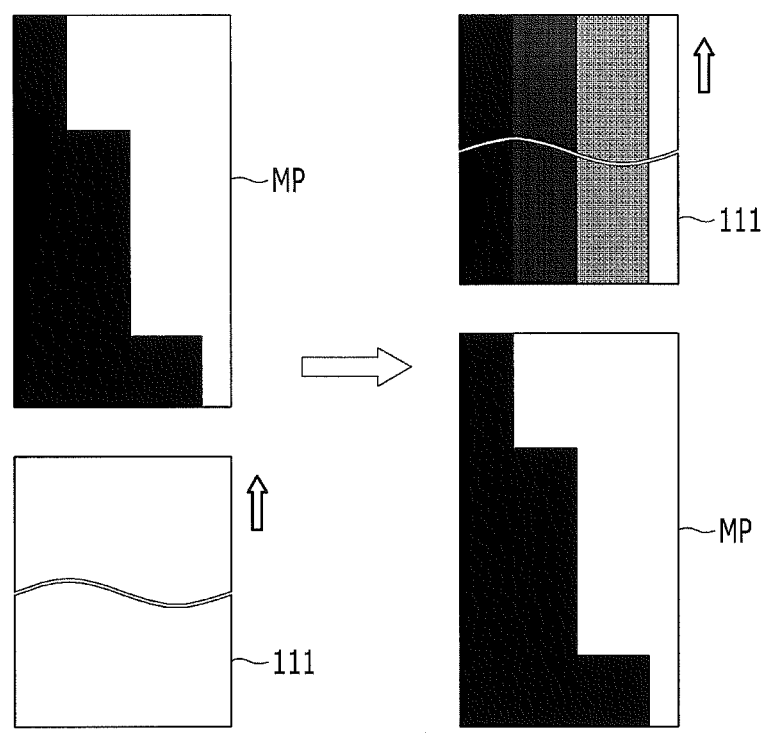
FIG. 42 is a diagram for describing an exemplary embodiment of a method for photoalignment according to the present invention.

FIG. 42 is a diagram for describing an exemplary embodiment of a method for photoalignment according to the present invention.

Referring to FIG. 42, first, the photomask MP of FIG. 40 is fixed onto the upper or lower alignment layer. In addition, the photoalignment is performed while moving an alignment layer 111 in an arrow direction.

In an exemplary embodiment, the alignment layer 111 may be fixed and the photomask MP may be moved. As such, the alignment layer corresponding to the transmissive region T8 is exposed by the light while passing through the transmissive region T8. In an exemplary embodiment, since a time and an area in which the alignment layer 111 is exposed by the light vary depending on the width of the transmissive region T8, energy transferred to the alignment layer 11 also varies. In an exemplary embodiment, the width of the transmissive region corresponds to the length of the transmissive region in a movement direction of the alignment layer 111.

Accordingly, exposure may be made with various energies by diversifying the size of the transmissive region T8, and as a result, domains having various polar angles and azimuth angles may be formed.

As described in the exemplary embodiments of the present invention, the photoalignment masks are combined by various methods to arrange the liquid crystal molecules in various directions. As such, when the photoalignment is variously formed, the visibility and transmittance of the liquid crystal display can be improved. In addition, when ions generated at the time of driving each pixel concentrates on any one point, an afterimage, and the like may occur, but it is possible to prevent the ions in the pixel from concentrating in any one direction by aligning the liquid crystals in various directions as described in the exemplary embodiments of the present invention. Therefore, since the afterimage which is caused due to the ions does not occur, it is possible to improve the response speed of the pixel.

According to the exemplary embodiments of the present invention, since the number of times a mask is used can be reduced by performing the photoalignment method according to the present invention, it is possible to reduce a process time for aligning the mask. In addition, since an alignment margin for aligning the mask which is repetitively used can be reduced, it is possible to design the mask to be free from misalignment. Further, since an undesired region by the misalignment is not generated, it is possible to minimize the reduction of transmittance.

Further, since liquid crystal alignment of various directions can be acquired using a photomask including a transflective region, the visibility and transmittance of a liquid crystal display are improved and an afterimage is reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. A photoalignment method, comprising:
irradiating light in a first direction to a first alignment layer without a mask;
disposing a first mask on the first alignment layer after irradiating the first alignment layer in the first direction; and
irradiating light in a second direction opposite the first direction after disposing the first mask on the first alignment layer.
2. The photoalignment method of claim 1, wherein:
a light irradiation energy of the light irradiated in the second direction is about 50% to about 500% of that of the light irradiated in the first direction.
3. The photoalignment method of claim 2, wherein:
the light irradiation energy of the light irradiated in the second direction is different from that of the light irradiated in the first direction.

4. The photoalignment method of claim 3, wherein:
the light irradiation energy of the light irradiated in the first direction ranges from about 1 mJ to about 5000 mJ.

5. The photoalignment method of claim 1, wherein:
the light is linearly polarized or partially polarized.

6. The photoalignment method of claim 5, wherein:
the light is irradiated slantingly with respect to the first alignment layer.

7. The photoalignment method of claim 6, wherein:
irradiation angles while irradiating the light in the first direction and the second direction are in the range of about 0<T<90.

8. The photoalignment method of claim 1, wherein:
the first mask comprises: a light blocking unit partially shielding a portion of the first alignment layer.

9. The photoalignment method of claim 8, wherein:
the light blocking unit is disposed in a predetermined pattern.

10. The photoalignment method of claim 8, wherein:
the light blocking unit is randomly disposed.

11. The photoalignment method of claim 8, wherein:
the first mask includes at least one of a light blocking region, a transmissive region, and a transflective region.

12. The photoalignment method of claim 11, wherein:
the light blocking region, the transmissive region, and the transflective region are disposed in predetermined pattern.

13. The photoalignment method of claim 12, wherein:
the light blocking region, the transmissive region, and the transflective region are disposed to form rows and columns.

14. The photoalignment method of claim 13, wherein:
the transflective region includes two or more regions having different transmittances.

15. The photoalignment method of claim 12, wherein:
a light transmittance of the transflective region is greater than that of the light blocking region and smaller than that of the transmissive region.

16. The photoalignment method of claim 11, wherein:
the light blocking region, the transmissive region, and the transflective region are randomly disposed.

17. The photoalignment method of claim 1, further comprising:
irradiating light in a third direction to a second alignment layer facing the first alignment layer; and
irradiating light in a fourth direction opposite the third direction after disposing a second mask on the second alignment layer,
wherein the first mask and the second mask include the light blocking region and the transmissive region, and layouts of the light blocking region and the transmissive region of the first mask and the second mask are different from each other.

18. The photoalignment method of claim 17, wherein:
at least one of the first mask and the second mask further includes the transflective region.

19. The photoalignment method of claim 18, wherein:
at least one of the first mask or the second mask includes at least one of the light blocking region, the transmissive region, and the transflective region, and
the light blocking region, the transmissive region, and the transflective region are disposed in a predetermined pattern.

20. The photoalignment method of claim 19, wherein:
the light blocking region, the transmissive region, and the transflective region are disposed to form rows and columns.

21. The photoalignment method of claim 20, wherein:
the transflective region includes two or more regions having different light transmittances.

22. The photoalignment method of claim 21, wherein:
a light transmittance of the transflective region is greater than that of the light blocking region and smaller than that of the transmissive region.

23. The photoalignment method of claim 18, wherein:
at least one of the first mask and the second mask includes at least one of the light blocking region, the transmissive region, and the transflective region, and
the light blocking region, the transmissive region, and the transflective region are randomly disposed.

24. The photoalignment method of claim 1, wherein:
an ultraviolet wavelength of the irradiated light ranges from about 270 nm to about 360 nm.

25. A method for photoalignment, the method comprising:
performing a primary photoalignment by irradiating light in a primary photoalignment direction onto a first alignment layer without a mask;
placing a first mask on the first alignment layer after performing the primary photoalignment; and
performing a secondary photoalignment by irradiating light in a secondary photoalignment direction onto the first alignment layer, the secondary photoalignment direction being opposite to the primary photoalignment direction,
wherein in performing of the secondary photoalignment, exposure of the first alignment layer to irradiating light is performed while fixing the first alignment layer with respect to the first mask and then moving the first mask or while fixing the first mask with respect to the first alignment layer and then moving the first alignment layer.

26. The method of claim 25, wherein:
the first mask includes a light blocking region and a plurality of transmissive regions.

27. The method of claim 26, wherein:
the widths of the transmissive regions are different from each other, and
the width of one of the transmissive regions corresponds to a length in a movement direction of the first alignment layer in the transmissive region.

28. The method of claim 25, further comprising:
performing a tertiary photoalignment by irradiating light in a tertiary photoalignment direction onto a second alignment layer facing the first alignment layer;
placing a second mask on the second alignment layer; and
performing a quaternary photoalignment by irradiating light in a quaternary photoalignment direction onto the second alignment layer, the quaternary photoalignment direction being opposite to the tertiary photoalignment direction,
wherein in the performing of the quaternary photoalignment, exposure of the second alignment layer to irradiating light is performed while fixing the second alignment layer with respect to the second mask and then moving the second mask or while fixing the second mask with respect to the second alignment layer and then moving the second alignment layer.

29. The method of claim 28, wherein:
the first mask includes a light blocking region and a plurality of transmissive regions.

30. The method of claim 29, wherein:
the widths of the transmissive regions are different from each other, and
the width of one of the transmissive regions corresponds to a length in a movement direction of the first alignment direction in the transmissive region.

* * * * *